(12) United States Patent
Kutchko et al.

(10) Patent No.: US 12,503,544 B2
(45) Date of Patent: Dec. 23, 2025

(54) ELASTOMERIC COMPOSITIONS AND METHODS OF USE

(71) Applicant: PPG Industries Ohio, Inc., Cleveland, OH (US)

(72) Inventors: Cynthia Kutchko, Pittsburgh, PA (US); Brian Chiang, Pittsburgh, PA (US); Bryan W. Wilkinson, Pittsburgh, PA (US); Eric S. Epstein, Pittsburgh, PA (US); Michael A. Bubas, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1025 days.

(21) Appl. No.: 17/429,505

(22) PCT Filed: Feb. 10, 2020

(86) PCT No.: PCT/US2020/017455
§ 371 (c)(1),
(2) Date: Aug. 9, 2021

(87) PCT Pub. No.: WO2020/167638
PCT Pub. Date: Aug. 20, 2020

(65) Prior Publication Data
US 2022/0098355 A1     Mar. 31, 2022

Related U.S. Application Data

(60) Provisional application No. 62/803,664, filed on Feb. 11, 2019.

(51) Int. Cl.
| | |
|---|---|
| *C08G 18/12* | (2006.01) |
| *B29C 64/106* | (2017.01) |
| *B33Y 70/00* | (2020.01) |
| *B33Y 80/00* | (2015.01) |
| *C08G 18/10* | (2006.01) |
| *C08G 18/24* | (2006.01) |
| *C08G 18/32* | (2006.01) |
| *C08G 18/48* | (2006.01) |
| *C08G 18/50* | (2006.01) |
| *C08G 18/61* | (2006.01) |
| *C08G 18/69* | (2006.01) |
| *C08G 18/75* | (2006.01) |
| *C08G 77/16* | (2006.01) |
| *C08K 3/36* | (2006.01) |
| *C08K 5/00* | (2006.01) |
| *C08L 75/02* | (2006.01) |

(52) U.S. Cl.
CPC ............ *C08G 18/12* (2013.01); *B29C 64/106* (2017.08); *C08G 18/10* (2013.01); *C08G 18/244* (2013.01); *C08G 18/246* (2013.01); *C08G 18/3228* (2013.01); *C08G 18/3234* (2013.01); *C08G 18/4804* (2013.01); *C08G 18/4837* (2013.01); *C08G 18/4854* (2013.01); *C08G 18/5024* (2013.01); *C08G 18/5036* (2013.01); *C08G 18/61* (2013.01); *C08G 18/69* (2013.01); *C08G 18/755* (2013.01); *C08G 77/16* (2013.01); *C08K 3/36* (2013.01); *C08K 5/0041* (2013.01); *C08L 75/02* (2013.01); *B33Y 70/00* (2014.12); *B33Y 80/00* (2014.12)

(58) Field of Classification Search
CPC .. C08G 18/12; C08G 18/246; C08G 18/3228; C08G 18/4804; C08G 18/4837; C08G 18/5024; C08G 18/5036; C08G 18/61; C08G 18/755; C08G 77/16; C08G 18/10; C08G 18/244; C08G 18/3234; C08G 18/4854; C08G 18/69; B29C 64/106; C08K 3/36; C08K 5/0041; C08L 75/02; B33Y 70/00; B33Y 80/00
See application file for complete search history.

(56) References Cited

U.S. PATENT DOCUMENTS

| | | |
|---|---|---|
| 3,517,082 A | 6/1970 | Cockerham |
| 3,563,957 A | 2/1971 | Beebe |
| 3,799,854 A | 3/1974 | Jerabek |
| 3,919,351 A | 11/1975 | Chang |
| 4,046,729 A | 9/1977 | Scriven et al. |
| 4,147,769 A | 4/1979 | Dea et al. |
| 4,220,679 A | 9/1980 | Backhouse |
| 4,403,003 A | 9/1983 | Backhouse |
| 4,546,045 A | 10/1985 | Elias |
| 4,623,711 A | 11/1986 | Morris et al. |
| 4,681,811 A | 7/1987 | Simpson et al. |
| 4,732,790 A | 3/1988 | Blackburn et al. |
| 4,798,746 A | 1/1989 | Claar et al. |

(Continued)

FOREIGN PATENT DOCUMENTS

| | | |
|---|---|---|
| CA | 2378348 A1 | 2/2001 |
| CA | 2950215 A1 | 12/2015 |

(Continued)

OTHER PUBLICATIONS

Universal Selector by SpecialChem, Desmophen® 550 U Technical Data Sheet—Supplied by Covestro, Mar. 4, 2021, 2 pages, http://coatings.specialchem.com.

(Continued)

*Primary Examiner* — Rabon A Sergent

(57) ABSTRACT

Compositions comprising a combination of low molecular weight prepolymers and high molecular weight prepolymers are disclosed. The compositions are used to fabricate elastomeric articles having high tensile strength and high tensile elongation.

17 Claims, No Drawings

(56) References Cited

U.S. PATENT DOCUMENTS

| | | |
|---|---|---|
| 5,071,904 A | 12/1991 | Martin et al. |
| 5,114,989 A | 5/1992 | Elwell et al. |
| 5,262,259 A | 11/1993 | Chou et al. |
| 5,468,802 A | 11/1995 | Wilt et al. |
| 5,777,061 A | 7/1998 | Yonek et al. |
| 6,172,179 B1 | 1/2001 | Zook et al. |
| 6,259,962 B1 | 7/2001 | Gothait |
| 6,454,972 B1 | 9/2002 | Morissette et al. |
| 6,500,549 B1 | 12/2002 | Deppisch et al. |
| 6,509,418 B1 | 1/2003 | Zook et al. |
| 6,558,753 B1 | 5/2003 | Ylitalo et al. |
| 6,875,800 B2 | 4/2005 | Vanier et al. |
| 6,894,086 B2 | 5/2005 | Munro et al. |
| 7,009,032 B2 | 3/2006 | Bojkova et al. |
| 7,247,596 B2 | 7/2007 | Jialanella et al. |
| 7,390,859 B2 | 6/2008 | Sawant et al. |
| 7,455,804 B2 | 11/2008 | Patel et al. |
| 7,531,117 B2 | 5/2009 | Ederer et al. |
| 7,578,958 B2 | 8/2009 | Patel et al. |
| 7,767,130 B2 | 8/2010 | Elsner et al. |
| 7,875,666 B2 | 1/2011 | Gilmore et al. |
| 7,879,955 B2 | 2/2011 | Rao et al. |
| 7,955,537 B2 | 6/2011 | Ederer et al. |
| 7,957,825 B2 | 6/2011 | Marsh et al. |
| 8,138,273 B2 | 3/2012 | Rao et al. |
| 8,466,220 B2 | 6/2013 | Rao et al. |
| 8,535,463 B2 | 9/2013 | Allen et al. |
| 8,541,513 B2 | 9/2013 | Hobbs et al. |
| 8,729,216 B2 | 5/2014 | Hobbs et al. |
| 8,816,023 B2 | 8/2014 | Anderson et al. |
| 8,876,513 B2 | 11/2014 | Lim et al. |
| 8,883,392 B2 | 11/2014 | Napadensky et al. |
| 8,952,124 B2 | 2/2015 | Rao et al. |
| 8,993,691 B2 | 3/2015 | Anderson et al. |
| 9,079,833 B2 | 7/2015 | Klobes et al. |
| 9,122,819 B2 | 9/2015 | McDowell et al. |
| 9,216,547 B2 | 12/2015 | Elsey |
| 9,370,132 B2 | 6/2016 | Coppola |
| 9,382,640 B2 | 7/2016 | Yamagata |
| 9,422,451 B2 | 8/2016 | Rao et al. |
| 9,452,445 B2 | 9/2016 | Frankenberger |
| 9,540,540 B2 | 1/2017 | Rao et al. |
| 9,650,537 B2 | 5/2017 | Kunc et al. |
| 9,663,619 B2 | 5/2017 | Echigoya et al. |
| 9,708,440 B2 | 7/2017 | Das et al. |
| 9,744,720 B2 | 8/2017 | Napadensk |
| 9,796,858 B2 | 10/2017 | Powell et al. |
| 9,862,059 B2 | 1/2018 | Liebl et al. |
| 9,873,761 B1 | 1/2018 | Das et al. |
| 9,883,711 B2 | 2/2018 | McDowell et al. |
| 9,944,826 B2 | 4/2018 | Czaplewski et al. |
| 9,982,164 B2 | 5/2018 | Rolland et al. |
| 9,992,917 B2 | 6/2018 | Yanke et al. |
| 10,016,941 B1 | 7/2018 | Beard et al. |
| 10,059,595 B1 | 8/2018 | Farbstein |
| 10,071,350 B2 | 9/2018 | Lewis et al. |
| 10,074,449 B2 | 9/2018 | White et al. |
| 10,139,808 B2 | 11/2018 | Engelbart et al. |
| 10,232,549 B2 | 3/2019 | Hayes et al. |
| 10,243,295 B2 | 3/2019 | Matlack et al. |
| 10,253,195 B2 | 4/2019 | Fenn et al. |
| 10,259,956 B2 | 4/2019 | Chopra et al. |
| 10,350,823 B2 | 7/2019 | Rolland et al. |
| 10,400,057 B2 | 9/2019 | Kwisnek et al. |
| 10,449,714 B2 | 10/2019 | Achten et al. |
| 10,464,031 B2 | 11/2019 | Lewis et al. |
| 10,538,031 B2 | 1/2020 | Chen et al. |
| 10,625,470 B2 | 4/2020 | Sun et al. |
| 10,639,842 B2 | 5/2020 | Leibig et al. |
| 10,639,844 B2 | 5/2020 | Rolland et al. |
| 10,683,381 B2 | 6/2020 | Abell et al. |
| 10,688,770 B2 | 6/2020 | Boydston et al. |
| 10,772,246 B2 | 9/2020 | Speaker et al. |
| 10,792,860 B2 | 10/2020 | Wantanabe et al. |
| 10,932,399 B1 | 2/2021 | Nowak et al. |
| 10,947,969 B2 | 3/2021 | Overend et al. |
| 10,948,082 B2 | 3/2021 | Delong et al. |
| 10,968,340 B1 | 4/2021 | Mapkar et al. |
| 11,192,632 B2 | 12/2021 | Dovey |
| 11,209,084 B2 | 12/2021 | Dovey |
| 2001/0043990 A1 | 11/2001 | Chong et al. |
| 2002/0122928 A1 | 9/2002 | Botrie et al. |
| 2002/0182339 A1 | 12/2002 | Taylor et al. |
| 2003/0004599 A1 | 1/2003 | Herbak |
| 2004/0189311 A1 | 9/2004 | Glezer et al. |
| 2004/0198940 A1 | 10/2004 | Wu et al. |
| 2004/0220327 A1 | 11/2004 | Cosman et al. |
| 2005/0171237 A1 | 8/2005 | Patel et al. |
| 2005/0287354 A1 | 12/2005 | Jennings et al. |
| 2006/0046068 A1 | 3/2006 | Barancyk et al. |
| 2006/0108450 A1 | 5/2006 | Klinkenberg et al. |
| 2006/0247403 A1 | 11/2006 | Nguyen-Kim et al. |
| 2007/0117656 A1* | 5/2007 | Rajagopalan ...... A63B 37/0064 473/371 |
| 2007/0141267 A1 | 6/2007 | Sonnenschein et al. |
| 2009/0065357 A1 | 3/2009 | Glezer et al. |
| 2009/0099291 A1 | 4/2009 | Jia et al. |
| 2009/0126225 A1 | 5/2009 | Jarvis |
| 2010/0041839 A1 | 2/2010 | Anderson et al. |
| 2010/0076143 A1 | 3/2010 | Yakulis et al. |
| 2010/0113252 A1 | 5/2010 | Bordia et al. |
| 2010/0234485 A1 | 9/2010 | Kohli et al. |
| 2010/0286426 A1 | 11/2010 | Cremer |
| 2012/0117822 A1 | 5/2012 | Jarvis |
| 2012/0159785 A1 | 6/2012 | Pyles et al. |
| 2012/0244337 A1 | 9/2012 | Gavin |
| 2012/0313056 A1 | 12/2012 | Baran et al. |
| 2013/0073073 A1 | 3/2013 | Pettis |
| 2013/0095253 A1 | 4/2013 | Lindsay et al. |
| 2013/0196124 A1 | 8/2013 | Flores et al. |
| 2013/0237661 A1 | 9/2013 | Brust et al. |
| 2013/0253084 A1 | 9/2013 | Duggal et al. |
| 2013/0271526 A1 | 10/2013 | Ciampini et al. |
| 2013/0284359 A1 | 10/2013 | Virnelson |
| 2013/0302575 A1 | 11/2013 | Moegele et al. |
| 2013/0344340 A1 | 12/2013 | Senkfor et al. |
| 2014/0012406 A1 | 1/2014 | Cioffi et al. |
| 2014/0017460 A1 | 1/2014 | Xu et al. |
| 2014/0220354 A1 | 8/2014 | Gao et al. |
| 2014/0323647 A1 | 10/2014 | Voit et al. |
| 2014/0331520 A1 | 11/2014 | Yakulus et al. |
| 2015/0014881 A1 | 1/2015 | Elsey |
| 2015/0307738 A1 | 10/2015 | Schmucker et al. |
| 2015/0321434 A1 | 11/2015 | Sterman et al. |
| 2016/0009029 A1 | 1/2016 | Cohen et al. |
| 2016/0039145 A1 | 2/2016 | Steiner |
| 2016/0083619 A1 | 3/2016 | Anderson et al. |
| 2016/0090507 A1 | 3/2016 | Keledjian et al. |
| 2016/0107391 A1 | 4/2016 | Parish et al. |
| 2016/0152775 A1 | 6/2016 | Tobis et al. |
| 2016/0167299 A1 | 6/2016 | Jallouli et al. |
| 2016/0244980 A1 | 8/2016 | Urban et al. |
| 2016/0250688 A1 | 9/2016 | Coppola |
| 2016/0257067 A1 | 9/2016 | Boydston et al. |
| 2016/0271872 A1 | 9/2016 | Sand |
| 2016/0271878 A1 | 9/2016 | Nuechterlein et al. |
| 2016/0297104 A1 | 10/2016 | Guillemette et al. |
| 2016/0319065 A1 | 11/2016 | Huang et al. |
| 2016/0332382 A1 | 11/2016 | Coward et al. |
| 2016/0333152 A1 | 11/2016 | Cook et al. |
| 2016/0374428 A1 | 12/2016 | Kormann et al. |
| 2017/0057160 A1 | 3/2017 | Duty et al. |
| 2017/0066196 A1 | 3/2017 | Beard et al. |
| 2017/0114208 A1 | 4/2017 | Rao et al. |
| 2017/0145202 A1 | 5/2017 | Sparks et al. |
| 2017/0246802 A1 | 8/2017 | Pyzik et al. |
| 2017/0266691 A1 | 9/2017 | Travis |
| 2017/0266877 A1 | 9/2017 | Tyler |
| 2017/0291357 A1 | 10/2017 | Fong et al. |
| 2017/0321083 A1 | 11/2017 | Fenn et al. |
| 2017/0341296 A1 | 11/2017 | Fenn et al. |
| 2017/0369620 A1 | 12/2017 | Abell et al. |
| 2017/0369737 A1 | 12/2017 | Cui et al. |
| 2018/0029291 A1 | 2/2018 | Matzner et al. |

(56) References Cited

U.S. PATENT DOCUMENTS

| | | |
|---|---|---|
| 2018/0056582 A1 | 3/2018 | Matusik et al. |
| 2018/0059541 A1 | 3/2018 | Campbell et al. |
| 2018/0086002 A1 | 3/2018 | Sun et al. |
| 2018/0100075 A1 | 4/2018 | Chopra et al. |
| 2018/0127617 A1 | 5/2018 | Kabagambe et al. |
| 2018/0133952 A1 | 5/2018 | Gu et al. |
| 2018/0133953 A1 | 5/2018 | Achten et al. |
| 2018/0133954 A1 | 5/2018 | Watanabe et al. |
| 2018/0162981 A1 | 6/2018 | Achten et al. |
| 2018/0207863 A1 | 7/2018 | Porter et al. |
| 2018/0215854 A1 | 8/2018 | Paranthaman et al. |
| 2018/0223795 A1 | 8/2018 | Tobin et al. |
| 2018/0244854 A1 | 8/2018 | Drazba et al. |
| 2018/0264719 A1 | 9/2018 | Rolland et al. |
| 2018/0362784 A1 | 12/2018 | Gorin et al. |
| 2019/0001553 A1 | 1/2019 | Robeson et al. |
| 2019/0010370 A1 | 1/2019 | Lin et al. |
| 2019/0030795 A1 | 1/2019 | Jiang et al. |
| 2019/0037969 A1 | 2/2019 | Busbee et al. |
| 2019/0040204 A1 | 2/2019 | Beyer et al. |
| 2019/0118497 A1 | 4/2019 | Kierbel et al. |
| 2019/0152133 A1 | 5/2019 | Busbee |
| 2019/0176998 A1 | 6/2019 | Renwick et al. |
| 2019/0217536 A1 | 7/2019 | Honorato et al. |
| 2019/0248065 A1 | 8/2019 | Gorin et al. |
| 2019/0276689 A1 | 9/2019 | Dhoble et al. |
| 2019/0358983 A1 | 11/2019 | Busbee et al. |
| 2020/0131385 A1 | 4/2020 | Bartow et al. |
| 2020/0164572 A1 | 5/2020 | Bartow et al. |
| 2020/0180220 A1 | 6/2020 | Nelson et al. |
| 2020/0217332 A1 | 7/2020 | Mohr et al. |
| 2020/0276797 A1 | 9/2020 | Zdrojek et al. |
| 2020/0312782 A1 | 10/2020 | Eid et al. |
| 2021/0008793 A1 | 1/2021 | Pokrass et al. |

FOREIGN PATENT DOCUMENTS

| | | |
|---|---|---|
| CN | 1287498 A | 3/2001 |
| CN | 102896923 A | 1/2013 |
| CN | 104031383 A | 9/2014 |
| CN | 104231894 A | 12/2014 |
| CN | 105313332 A | 2/2016 |
| CN | 107471629 A | 12/2017 |
| CN | 108610466 A | 10/2018 |
| CN | 109041563 A | 12/2018 |
| CN | 109247005 A | 1/2019 |
| CN | 110628192 A | 12/2019 |
| CN | 111087792 A | 5/2020 |
| CN | 111391305 A | 7/2020 |
| CN | 111774561 A | 10/2020 |
| DE | 19937770 A1 | 2/2001 |
| DE | 102011003619 A1 | 8/2012 |
| DE | 102015220699 A1 | 3/2017 |
| EP | 0437374 B1 | 12/1996 |
| EP | 2416950 A1 | 2/2012 |
| EP | 2658702 A1 | 11/2013 |
| EP | 2719484 A1 | 4/2014 |
| EP | 2851208 A1 | 3/2015 |
| EP | 3059171 A1 | 8/2016 |
| EP | 3232071 A1 | 10/2017 |
| EP | 3550142 A1 | 10/2019 |
| EP | 3626442 A1 | 3/2020 |
| EP | 3626443 A1 | 3/2020 |
| FR | 3039553 A1 | 2/2017 |
| JP | H03-210364 A | 9/1991 |
| JP | H04-366617 A | 12/1992 |
| JP | 2001-518408 A | 10/2001 |
| JP | 2002-166460 A | 6/2002 |
| JP | 2003-506228 | 2/2003 |
| JP | 2011-105906 A | 6/2011 |
| JP | 5085800 B1 | 11/2012 |
| JP | 2013-136724 A | 7/2013 |
| JP | 2014-521797 A | 8/2014 |
| JP | 2015-512816 A | 4/2015 |
| JP | H06-026637 B2 | 11/2015 |
| JP | 2016-530430 A | 9/2016 |
| JP | 62-53354 B2 | 12/2017 |
| JP | 2018-002896 A | 1/2018 |
| JP | 2018-502197 A | 1/2018 |
| JP | 2019-504919 A | 2/2019 |
| KR | 101891560 A | 3/2018 |
| RU | 2247087 C2 | 2/2005 |
| RU | 2332265 C2 | 8/2008 |
| RU | 2532190 C2 | 10/2014 |
| RU | 2014113527 A | 10/2015 |
| RU | 2673840 C1 | 11/2018 |
| RU | 2677143 C1 | 1/2019 |
| TW | 201509698 A | 3/2015 |
| TW | 201821248 A | 6/2018 |
| WO | 2001/010630 A1 | 2/2001 |
| WO | 2004/076852 A1 | 9/2004 |
| WO | 2006/073695 A1 | 7/2006 |
| WO | 2007/044735 A2 | 4/2007 |
| WO | 2010/024904 A1 | 3/2010 |
| WO | 2013/091003 A1 | 6/2013 |
| WO | 2016/061060 A1 | 4/2016 |
| WO | 2016/085914 A1 | 6/2016 |
| WO | 2016/085976 A1 | 6/2016 |
| WO | 2016/090468 A1 | 6/2016 |
| WO | 2016/106352 A1 | 6/2016 |
| WO | 2016085992 A1 | 6/2016 |
| WO | 2016/149032 A1 | 9/2016 |
| WO | 2016/164562 A1 | 10/2016 |
| WO | 2016/182805 A1 | 11/2016 |
| WO | 2016/201103 A1 | 12/2016 |
| WO | 2017/087055 A1 | 5/2017 |
| WO | 2017/095658 A1 | 6/2017 |
| WO | 2017/112682 A1 | 6/2017 |
| WO | 2017/144461 A1 | 8/2017 |
| WO | 2018/005686 A1 | 1/2018 |
| WO | 2018/007579 A1 | 1/2018 |
| WO | 2017/130685 A1 | 2/2018 |
| WO | 2018/026829 A1 | 2/2018 |
| WO | 2018/031532 A1 | 2/2018 |
| WO | 2018/049038 A1 | 3/2018 |
| WO | 2018/072034 A1 | 4/2018 |
| WO | 2018/085650 A1 | 5/2018 |
| WO | 2017/092764 A1 | 6/2018 |
| WO | 2018/106822 A1 | 6/2018 |
| WO | 2018/113875 A1 | 6/2018 |
| WO | 2018157148 A1 | 8/2018 |
| WO | 2019/089235 A1 | 5/2019 |
| WO | 2019/173511 A1 | 9/2019 |
| WO | 2019/191509 A1 | 10/2019 |
| WO | 2019/204770 A1 | 10/2019 |
| WO | 2019/217848 A1 | 11/2019 |
| WO | 2019/224699 A1 | 11/2019 |
| WO | 2020/107365 A1 | 6/2020 |
| WO | 2020/147567 A1 | 7/2020 |
| WO | 2020/251661 A1 | 12/2020 |

OTHER PUBLICATIONS

Covestro Desmodur® VL Product Data Sheet, Sep. 1, 2015, 3 pages.

International Preliminary Report on Patentability received for PCT Patent Application No. PCT/US2020/017455, mailed on Aug. 26, 2021, 10 pages.

International Search Report and Written Opinion for Application No. PCT/US2015/062297, mailed on Mar. 4, 2016, 10 pages.

International Search Report and Written Opinion for Application No. PCT/US2015/062445, mailed on Mar. 1, 2016, 10 pages.

International Search Report and Written Opinion for Application No. PCT/US2015/062412, mailed on Mar. 2, 2016, 9 pages.

International Search Report and Written Opinion for Application No. PCT/IB2018/056254, mailed on Nov. 19, 2018, 10 pages.

International Search Report and Written Opinion for Application No. PCT/US2019/026672, mailed on Jul. 25, 2019, 12 pages.

International Search Report and Written Opinion for Application No. PCT/US2020/017428, mailed on Jul. 29, 2020, 18 pages.

International Search Report and Written Opinion for Application No. PCT/US2020/017455, mailed on May 25, 2020, 11 pages.

(56) References Cited

OTHER PUBLICATIONS

International Search Report and Written Opinion for Application No. PCT/US2020/017464, mailed on May 25, 2020, 9 pages.
International Search Report and Written Opinion for Application No. PCT/US2020/039557, mailed on Oct. 8, 2020, 13 pages.
International Search Report and Written Opinion for Application No. PCT/US2020/017417, mailed on Jun. 12, 2020, 10 pages.
International Search Report and Written Opinion for Application No. PCT/US2020/017441, mailed on Jun. 22, 2020, 8 pages.
International Preliminary Report on Patentability for Application No. PCT/US2015/062297, mailed on May 30, 2017, 7 pages.
International Preliminary Report on Patentability for Application No. PCT/US2015/062445, mailed on May 30, 2017, 8 pages.
International Preliminary Report on Patentability for Application No. PCT/US2015/062412, mailed on May 30, 2017, 7 pages.
First Report for Australian Application No. 2015353730, mailed on Mar. 15, 2018, 6 pages.
First Report for Australian Application No. 2015353634, mailed on Mar. 5, 2018, 6 pages.
First Report for Australian Application No. 2015353618, mailed on Sep. 21, 2017, 6 pages.
Canadian Office Action for Application No. 2,968,549, mailed on May 7, 2018, 4 pages.
Canadian Office Action for Application No. 2,968,670, mailed on Jun. 11, 2018, 3 pages.
Canadian Office Action for Application No. 2,968,538, mailed on Jun. 6, 2018, 4 pages.
Russia Office Action for Application No. 2017121858, mailed on May 16, 2018, 2 pages.
Russia Office Action for Application No. 2017122126, mailed on May 16, 2018, 4 pages.
Asif, M. et al., "A new photopolymer extrusion 5-axis 3D printer," Additive Manufacturing, 2018, vol. 23, p. 355-361.
Asif, M. et al., "A New 3D Printing Technique Using Extrusion of Photopolymer," Conference Paper, Jan. 2017, 11 pages.
"The Jeffaminer Polyetheramines," Huntsman, 2007, 6 pages.
Broekaert, "Polyurea Spray Coatings: The Technology and Latest Developments," Paint & Coatings Industry, Mar. 2002, 15 pages.
Formlabs White Paper: 3D Printing with Desktop Stereolithography, An Introduction for Professional Users, Jun. 2015, retrieved from https://archive-media.formlabs.com/upload/Intro-sla-whitepaper-04.pdf, 12 pages.
Hurlbert. "Visual perception: Learning to see through noise", Current Biology, Mar. 2000, vol. 10, No. 6, p. R231-R233.
Kitano, H. et al., "Unexpected Visible-Light-Induced Free Radical Photopolymerization at Low Light Intensity and High Viscosity Using a Titanocene Photoinitiator," Journal of Applied Polymer Science, 2013, p. 611-618.
Krober, P. et al., "Reactive inkjet printing of polyurethanes," Journal of Material Chemistry, 2009, vol. 19, p. 5234-5238.
Quadion LLC, Minnesota Rubber and Plastic, Thermoset Plastics vs Thermoplastics, https://www.mnrubber.com/Design_Guide/5-2.html, Oct. 25, 2014, accessed Nov. 7, 2019.
Rios, Orlando, "Evaluation of Advanced Polymers for Additive Manufacturing," CRADA Final Report NFE-14-05252, Oak Ridge National Laboratory, Sep. 8, 2017, 29 pages.
Smith, P. et al., "Reactive inkjet printing," Journal of Materials Chemistry, 2012, vol. 22, p. 10965-10970.
Viscosity of Water, retrieved from https://www.engineersedge.com/physics/water_density_viscosity_specific_weight_13146.htm, accessed Apr. 20, 2020, first published Jun. 25, 2014.
Zhu et al., "Water-based coatings for 3D printed parts", Journal of Coatings Technology and Research, Jul. 2015, vol. 12, No. 5, p. 889-897.

* cited by examiner

ELASTOMERIC COMPOSITIONS AND METHODS OF USE

This application claims the benefit under 35 U.S.C. § 119(e) of U.S. Provisional Application No. 62/803,664 filed on Feb. 11, 2019, which is incorporated by reference in its entirety.

FIELD

The present disclosure relates to elastomeric compositions and methods of fabricating elastomeric articles using the elastomeric compositions. The compositions comprise a combination of lower molecular weight elastomeric prepolymers and a higher molecular weight elastomeric prepolymer. The compositions can be used to fabricate elastomeric articles having a high tensile strength and a high tensile elongation.

BACKGROUND

For many polymer applications it is desirable that a material have both a high tensile strength and a high tensile elongation (high % elongation). Tensile strength can be increased by adding filler to the polymer. Alternative methods of providing an elastomeric article having both high tensile strength and high tensile strain are desired.

SUMMARY

According to the present invention, coreactive compositions comprise (a) a first elastomeric prepolymer; (b) a second elastomeric prepolymer; and (c) a third elastomeric prepolymer, wherein, the first prepolymer is reactive with the second elastomeric prepolymer; each of the first elastomeric prepolymer and the second elastomeric prepolymer independently comprises a number average molecular weight from 1,000 Da to 20,000 Da; the third elastomeric prepolymer comprises a number average molecular weight from 50,000 Da to 500,000 Da; and the number average molecular weight is determined by gel permeation chromatography.

DETAILED DESCRIPTION

For purposes of the following detailed description, it is to be understood that the invention may assume various alternative variations and step sequences, except where expressly specified to the contrary. Moreover, other than in any operating examples or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

The use of the singular includes the plural and plural encompasses singular, unless specifically stated otherwise. In addition, the use of "or" means "and/or" unless specifically stated otherwise, even though "and/or" may be explicitly used in certain instances.

A "backbone" of a prepolymer refers to the segment between the reactive functional groups. A prepolymer backbone typically includes repeating subunits. For example, the backbone of a polythiol having the structure HS—(R—)$_n$—SH is —(R—)$_n$—.

"Coreactive composition" refers to a composition comprising a first reactive compound and a second reactive compound where the first reactive compound is reactive with the second reactive compound. A coreactive composition can be prepared by combining and mixing a first component and a second component. The first component can comprise the first reactive compound and the second component can comprise the second reactive compound, and the first component and/or the second component can optionally comprise a catalyst, a cure accelerator, and/or a polymerization initiator. The first component can comprise the first reactive compound and the second reactive compound, and the second component can comprise a catalyst, a cure accelerator, and/or a polymerization initiator.

"Elastomer," "elastomeric' and similar terms refer to materials with "rubber-like" properties and generally having a low Young's modulus and a high tensile strain. For example, elastomers can have a Young's modulus/tensile strength from about 4 MPa to about 30 MPa. Elastomers can have a tensile strain (elongation at break) from about 100% to about 2,000%. The Young's modulus/tensile strength and tensile strain can be determined according to ASTM D412.4893. Tensile strain at break is also referred to as % elongation. Elastomers can exhibit a tear strength, for example, from 50 kN/m to 200 kN/m. Tear strength of an elastomer can be determined according to ASTM D624. The Young's modulus of an elastomer can range from 0.5 MPa to 6 MPa as determined according to ASTM D412.4893.

A "lower molecular weight" prepolymer refers to a prepolymer having a number average molecular weight equal to or less than 20,000 Da, less than 15,000 Da, less than 10,000 Da, less than 5,000 Da, less than 4,000 Da, or less than 3,500 Da, where the number average molecular weight is determined using gel permeation chromatography.

A "higher molecular weight" prepolymer refers to a prepolymer having a number average molecular weight equal to or greater than 50,000 Da, greater than 100,000 Da, or greater than 250,000 Da, where the number average molecular weight is determined using gel permeation chromatography.

"Prepolymer" refers to homopolymers and copolymers. For thiol-functional prepolymers, the number average molecular weights "Mn" is determined by end group analysis using iodine titration. For prepolymers that are not thiol-functional, the number average molecular weight is determined by gel permeation chromatography using polystyrene standards. A prepolymer comprises reactive groups capable of reacting with another compound such as a curing agent or a crosslinker to form a cured polymer. A prepolymer includes multiple repeating subunits bonded to each other than can be the same or different. The multiple repeating subunits make up the backbone of the prepolymer.

Shore A hardness is measured using a Type A durometer in accordance with ASTM D2240.

Specific gravity is determined according to ISO 787-11.

Tensile strength, tensile elongation, and % elongation are measured according to ASTM D412.4893.

Viscosity of a coreactive composition is measured using an Anton Paar MCR 302 rheometer with a gap from 1 mm at a temperature of 25° C. and a shear rate of 100 sec$^{-1}$. Viscosity of a prepolymer is measured at a temperature of about 25° C. and a pressure of about 760 mm Hg (101 kPa) determined according to ASTM D-2849 § 79-90 using a Brookfield CAP 2000 viscometer with a No. 6 spindle, at speed of 300 rpm, and at a temperature of 25° C.

Reference is now made to certain compounds, compositions, and methods of the present invention. The disclosed compounds, compositions, and methods are not intended to be limiting of the claims. To the contrary, the claims are intended to cover all alternatives, modifications, and equivalents.

Coreactive compositions provided by the present disclosure comprise (a) a first elastomeric prepolymer; (b) a second elastomeric prepolymer; and (c) a third elastomeric prepolymer, wherein, the first prepolymer is reactive with the second elastomeric prepolymer; each of the first elastomeric prepolymer and the second elastomeric prepolymer independently comprises a number average molecular weight from 1,000 Da to 20,000 Da; the third elastomeric prepolymer comprises a number average molecular weight from 50,000 Da to 500,000 Da; and the number average molecular weight is determined by gel permeation chromatography.

Incorporating at least one higher molecular weight elastomeric prepolymer (i.e the third elastomeric prepolymer) into an elastomeric composition comprising lower molecular weight elastomeric prepolymers (i.e. the first and second elastomeric prepolymers) can improve the tensile strength of a cured elastomer without compromising the tensile elongation and hardness.

A first and second elastomeric prepolymer can comprise any suitable elastomeric prepolymer backbone. Examples of suitable prepolymers having an elastomeric backbone include polyethers, polybutadienes, fluoroelastomers, perfluoroelastomers, ethylene/acrylic copolymers, ethylene propylene diene terpolymers, nitriles, polythiolamines, polysiloxanes, chlorosulfonated polyethylene rubbers, isoprenes, neoprenes, polysulfides, polythioethers, silicones, styrene butadienes, and combinations of any of the foregoing. For example, a first elastomeric prepolymer and a second elastomeric prepolymer can comprise a polyether prepolymer, which can be the same or different polyether prepolymers; or a first elastomeric prepolymer and a second elastomeric prepolymer can comprise elastomeric prepolymers having different elastomeric backbones. For example, a first elastomeric prepolymer can comprise a polyether prepolymer and a second elastomeric prepolymer can comprise a polybutadiene prepolymer.

Examples of suitable elastomeric backbones include polytetramethyleneglycols (PTMEG), polypropylene glycols, and polyoxypropylene glycols.

A first elastomeric prepolymer and a second elastomeric prepolymer can independently comprise a polyether backbone. A polyether backbone can comprise at least one alkylene oxide, such as an ethylene oxide and/or propylene oxide. Examples of suitable polyether backbones include poly(oxytetramethylene)s, poly(oxytetraethylene)s, poly(oxy-1,2-propylene)s, and poly(oxy-1,2-butylene)s, and combinations of any of the foregoing.

Each of the first elastomeric prepolymer and the second elastomeric prepolymer can comprise the same polymeric backbone or a different polymeric backbone. For example, each of the first elastomeric prepolymer and the second elastomeric prepolymer can independently comprise a polyether backbone; or, for example, the first elastomeric prepolymer can comprise a polyether backbone and the second elastomeric prepolymer can comprise a polythioether backbone; or, for example, the first elastomeric prepolymer can comprise a polyether backbone and the second elastomeric prepolymer can comprise a polybutadiene backbone.

Each of the first elastomeric prepolymer and the second elastomeric prepolymer can independently comprise a number average molecular weight, for example, from 500 Da to 20,000 Da, from 1,000 Da to 15,000 Da, from 1,000 Da to 10,000 Da, from 1,000 Da to 5,000 Da, from 1,000 Da to 4,000 Da, or from 1,000 Da to 3,000 Da, where the number average molecular weight is determined using gel permeation chromatography. Each of the first elastomeric prepolymer and the second elastomeric prepolymer can independently comprise a number average molecular weight, for example, greater than 500 Da, greater than 1,000 Da, greater than 2,000 Da, greater than 3,000 Da, greater than 4,000 Da, greater than 6,000 Da, greater than 8,000 Da, or greater than 10,000 Da, where the number average molecular weight is determined using gel permeation chromatography. Each of the first elastomeric prepolymer and the second elastomeric prepolymer can independently comprise a number average molecular weight, for example, less than 20,000 Da, less than 10,000 Da, less than 8,000 Da, less than 6,000 Da, less than 4,000 Da, less than 2,000 Da, or less than 1,000 Da where the number average molecular weight is determined using gel permeation chromatography.

The first and second elastomeric prepolymers can have the same or different polymeric backbones.

The first elastomeric prepolymer can be reactive with the second elastomeric prepolymer. For example, the first elastomeric prepolymer can comprise one or more first functional groups such as two or more first functional groups, and the second elastomeric prepolymer can comprise one or more second functional groups such as two or more second functional groups, where the first functional groups are reactive with the second functional groups.

A functional group or combination of functional groups can be selected to achieve, for example, a desired curing rate.

For example, a first functional group can comprise a thiol group, and a second functional group can comprise a thiol group, an alkenyl group, an alkynyl group, an epoxy group, a Michael acceptor group, an isocyanate group, or a combination of any of the foregoing.

A first functional group can comprise, for example, an isocyanate and a second functional group can comprise a hydroxyl group, an amine group, a thiol group, or a combination of any of the foregoing.

A first functional group can comprise, for example, an epoxy group and a second functional group can comprise an epoxy group.

A first functional group can comprise, for example, a Michael acceptor group and a second functional group can comprise a Michael donor group.

A first functional group can comprise, for example, a carboxylic acid group and the second functional group can comprise an epoxy group.

A first functional group can comprise, for example, a cyclic carbonate group, an acetoacetate group, or an epoxy group; and the second functional group can comprise a primary amine group, or a secondary amine group.

A first functional group can comprise a Michael acceptor group such as (meth)acrylate group, a cyanoacrylate, a vinylether a vinylpyridine, or an α,β-unsaturated carbonyl group and the second functional group can comprise a malonate group, an acetylacetonate, a nitroalkane, or other active alkenyl group.

A first functional group can comprise an amine and a second functional group can comprise selected from an epoxy group, an isocyanate group, an acrylonitrile, a carboxylic acid including esters and anhydrides, an aldehyde, or a ketone.

Suitable coreactive functional groups are described, for example, in Noomen, Proceedings of the XIIIth International Conference in Organic Coatings Science and Technology, Athens, 1987, page 251; and in Tillet et al., Progress in Polymer Science, 36 (2011), 191-217.

Functional groups can be selected to coreact at temperatures, for example, less than 50° C., less than 40° C., less than 30° C., less than 20° C., or less than 10° C. Functional groups can be selected to coreact at temperatures, for example, greater than 5° C., greater than 10° C., greater than 20° C., greater than 30° C., or greater than 40° C. Functional groups can be selected to coreact, for example, at temperatures from 5° C. to 50° C., from 10° C. to 40° C., from 15° C., to 35° C., or from 20° C. to 30° C.

Each of the first elastomeric prepolymer and the second elastomeric prepolymer can independently comprise a reactive functionality, for example, from 2 to 6, such as 2, 3, 4, 5, or 6. Reactive functionality refers to the number of functional groups of a prepolymer. A combination of prepolymers having a different reactive functionality can have a non-integer average reactive functionality.

Each of the first elastomeric prepolymer and the second elastomeric prepolymer can independently comprise a prepolymer having a single functionality or can comprise a combination of prepolymers having different functionalities. For example, each of the first elastomeric prepolymer and the second elastomeric prepolymer can independently comprise an average reactive functionality from 2.1 to 5.9, such as from 2.15 to 4, from 2.2 to 3, or from 2.3 to 2.6.

The cure rate for any of these coreactive chemistries can be modified by including an appropriate catalyst or combination of catalysts in a coreactive composition. The cure rate for any of these coreactive chemistries can be modified by increasing or decreasing the temperature of the coreactive composition. For example, although a coreactive composition can cure at temperatures less than 30° C., heating the coreactive composition can accelerate the reaction rate, which can be desirable under certain circumstances such as to accommodate an increased printing speed. Increasing the temperature of the coreactive components and/or the coreactive composition can also serve to adjust the viscosity to facilitate mixing the coreactive components and/or depositing the coreactive composition.

A coreactive composition provided by the present disclosure can comprise a first elastomeric prepolymer comprising one or more isocyanate groups such as two or more isocyanate groups, and a second elastomeric prepolymer comprise one or more amine groups such as two or more amine groups. For example, the first elastomeric prepolymer can comprise a polyisocyanate elastomeric prepolymer and the second elastomeric prepolymer can comprise a polyamine elastomeric prepolymer.

A polyisocyanate elastomeric prepolymer can comprise any suitable isocyanate-functional lower molecular weight prepolymer.

For example, an isocyanate-functional elastomeric prepolymer can comprise a polyether backbone.

An isocyanate-functional elastomeric prepolymer can be synthesized by reacting a polyisocyanate such as a diisocyanate with a polyether polyol such as a polyether diol.

Examples of suitable polyether diols include Terathane® polyether diols such as Terathane® 200 and Terathane® 650 available from Invista Corporation, Polymeg® polytetramethylene ether glycols such as Polymeg® 650, Polymeg® 1000, and Polymeg® 2000, available from Lyondell Chemical Company, PolyTHF® polyether diols available from BASF.

A polyamine elastomeric prepolymer can comprise any suitable amine-functional lower molecular weight elastomeric prepolymer.

For example, a polyamine elastomeric prepolymer can comprise a polyoxyalkyleneamine. Polyetheramines contain two or more primary amino groups attached to a backbone, derived, for example, from propylene oxide, ethylene oxide, or a mixture thereof. Examples of suitable polyetheramines include amine-functional polytetramethyleneglycols (PT-MEG), amine-functional polypropylene glycols, amine-functional polyoxypropylene glycols such as polyoxypropylenediamines, and glycerol tris(poly(propylene glycol). Polyetheramines can have a number average molecular weight, for example, from 500 Da to 7,500 Da. Examples of suitable commercially available polyetheramines include Jeffamine® polyetheramines available from Huntsman and include polyether diamines such as Jeffamine® D-2000 and Jeffamine® D4000, polyether diamines Jeffamine® ED-600, ED-900, ED-2003, and polyether triamines such as Jeffamine® T-3000 and Jeffamine® T-5000.

Examples of suitable polyether amines include Jeffamine® polyetheramines from Huntsman Corp., and polyetheramines available from BASF. Examples of suitable polyetheramines include polyoxypropylenediamine.

The first elastomeric prepolymer and/or the second elastomeric prepolymer can independently comprise, for example, a polyether prepolymer backbone comprising at least one moiety having the structure of Formula (1a)-(1e):

  (1a)

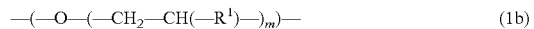  (1b)

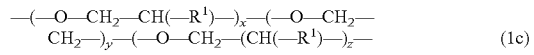  (1c)

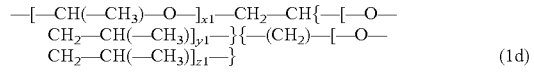  (1d)

  (1e)

wherein,
n can be an integer from 10 to 5,000;
m can be an integer from 10 to 5,000;
each $R^1$ can independently be selected from hydrogen, methyl, and ethyl;
y can be an integer from 2 to 50;
the sum of x+z can be an integer from 1 to 10; and
the sum of x1+y1+z1 can be an integer from 5 to 100.

A polyether prepolymer can have a functionality of 2 or 3; or can have an average functionality from 2 to 3. A polyether prepolymer can have a number average molecular weight, for example, from 1,000 Da to 10,000 Da. A polyether prepolymer can have a number average molecular weight, for example, less than 20,000 Da, less than 10,000 Da, less than 5,000 Da, or less than 3,500 Da. A polyether prepolymer can have a number average molecular weight, for example, greater than 1,000 Da, greater than 2,000 Da, greater than 4.00 Da, greater than 5,000 Da or greater than 10,000 Da.

A polyether prepolymer can have the structure of Formula (2):

$$R^{10}-[CH(-CH_3)-O-]_{x1}-CH_2-CH\{-[O-CH_2-CH(-CH_3)-]_{y1}-R^{10}\}\{-(CH_2)-[O-CH_2-CH(-CH_3)-]_{z1}-R^{10}\} \quad (2)$$

where,
the sum of $x1+y1+z1$ can be an integer from 5 to 100; and
$R^{10}$ can comprise an amine group or an isocyanate group.

For example, for an amine-functional polyether prepolymer of Formula (2), each $R^{10}$ can be $-NH_2$; and for an isocyanate-functional polyether prepolymer of Formula (2) each $R^{10}$ can be derived from a diisocyanate.

An isocyanate-functional polyether prepolymer can comprise the reaction product of reactants, where the reactants comprise a diisocyanate and a polyol prepolymer such as a polyether polyol prepolymer. An isocyanate-functional polyether prepolymer can be prepared, for example, by reacting a polyisocyanate with a polyether polyol in the presence of a tin-based catalyst such as dibutyl tin dilaurate, at elevated temperature. The amount of polyisocyanate to polyether polyol can be selected to provide an isocyanate-functional prepolymer having a desired number average molecular weight, a desired isocyanate functionality, or a combination thereof.

For example, the reactants can comprise a molar ratio of diisocyanate to polyether polyol from 4:1 to 2:1, from 3.5:1 to 2.5:1, or from 3.25:1 to 2.75:1.

For example, the reactants can comprise an equivalent ratio of diisocyanate to polyether polyol from 4:1 to 2:1, from 3.5:1 to 2.5:1, or from 3.25:1 to 2.75:1.

A diisocyanate can comprise any suitable diisocyanate such as an aliphatic diisocyanate, a cycloaliphatic diisocyanate, or an aromatic diisocyanate. For example, a diisocyanate can be a cycloaliphatic diisocyanate such as isophorone diisocyanate (IPDI).

A polyether polyol prepolymer can comprise, for example, a polyethylene glycol prepolymer, a polypropylene glycol polytetramethylene glycol, or a combination of any of the foregoing. A polyether polyol can comprise polyether diol prepolymer. A polyether diol prepolymer can have a number average molecular weight, for example, from 1,000 Da, to 5,000 Da, such as from 2,000 Da to 4,000 Da. A polyether diol prepolymer can have a number average molecular weight, for example, less than 5,000 Da or less than 4,000 Da.

A polyether glycol can comprise a polytetramethylene glycol. Suitable polytetramethylene glycols include Polymeg® polyols available from Lyondell Chemical Company.

For example, a polyether prepolymer can comprise a backbone having the structure of Formula (3):

$$-(CH(-CH_3)-CH_2-O-)_n-CH_2-CH(-CH_3)- \quad (3)$$

where n can be an integer from 2 to 100; a structure of Formula (4):

$$-CH(-CH_3)-CH_2-(O-CH_2-CH(-CH_3)-)_x-(O-CH_2-CH_2-)_y-(O-CH_2-CH(-CH_3)-)_z- \quad (4)$$

where y can be an integer from 2 to 50, and the sum of $x+z$ can be an integer from 1 to 10; a structure of Formula (5):

$$-(CH_2)_x-O-CH_2-CH_2-O-(CH_2)_m- \quad (5)$$

where each m can independently be an integer from 2 to 10 and x can be an integer from 1 to 10; or a structure of Formula (6):

$$-[CH(-CH_3)-O-]_{x1}-CH_2-CH\{-[O-CH_2-CH(-CH_3)]_{y1}-\}\{-(CH_2)-[O-CH_2-CH(-CH_3)-]_{z1}-\} \quad (6)$$

where the sum of $x1+y1+z1$ can be an integer from 5 to 100.

A first and/or second prepolymer can be an amine-functional or isocyanate-functional prepolymer having a backbone of a moiety of Formula (3)-(6).

For example, an isocyanate-functional polyether prepolymer can have the structure of Formula (7):

$$O=C=N-R^3-[NH-C(=O)-O-R^4-O-C(=O)-NH-R^3-]_p-N=C=O \quad (7)$$

where,
p can be an integer from 1 to 10;
$R^3$ can be the core of isophorone diisocyanate;
$R^4$ can be $-[-(CH_2)_4-O-]_n-$ or a moiety of any one of Formula (3)-(6); and
n is an integer from 15 to 40.

In an isocyanate-functional polyether prepolymer of Formula (7), $R^4$ can be $-[-(CH_2)_4-O-]_n-$.

In a polyether prepolymer of Formula (7), $R^4$ can be $-[-(CH_2)_4-O-]_n-$; and $R^3$ can have the structure of Formula (8):

(8)

In prepolymers of Formula (7), n can be an integer, for example, from 20 to 35, or from 25 to 30.

An isocyanate-functional prepolymer can comprise the reaction product of a diisocyanate and a polybutadiene prepolymer. A diisocyanate can comprise a diisocyanate as disclosed herein. A polybutadiene can comprise a hydroxyl-functional polybutadiene. Examples of suitable hydroxyl-functional polybutadienes include Krasol® LBH 2000, Krasol® LBH 3000, Krasol® LBH 5000, and Krasol® LBH 10000, which are available from Total.

A polybutadiene can have a backbone having the structure of Formula (9):

$$-CH(-CH_3)-CH_2-(CH_2-CH=CH-CH_2-)_{n3}-CH_2-CH(-CH_3)- \quad (9)$$

where n3 can be an integer from 30 to 220.

Compositions provided by the present disclosure can comprise a third elastomeric prepolymer or combination of third elastomeric prepolymers.

A third elastomeric prepolymer can comprise any suitable elastomeric prepolymer. Examples of suitable prepolymers having an elastomeric backbone include polyethers, polybutadienes, fluoroelastomers, perfluoroelastomers, ethylene/ acrylic copolymers, ethylene propylene diene terpolymers, nitriles, polythiolamines, polysiloxanes, chlorosulfonated polyethylene rubbers, isoprenes, neoprenes, polysulfides, polythioethers including any of the polythioethers disclosed herein, silicones, styrene butadienes, and combinations of any of the foregoing.

A third elastomeric prepolymer can comprise a polysiloxane, such as, for example, a polymethylhydrosiloxane, polydimethylsiloxane, polyhydrodiethylsiloxane, polydiethylsiloxane, or a combination of any of the foregoing.

A third elastomeric prepolymer can have a number average molecular weight that is greater than the number average molecular weight of each of the first elastomeric prepolymer and the second elastomeric prepolymer. For example, the third elastomeric prepolymer can have a number average molecular weight that is at least 10 times greater, at least 20 times greater, at least 30 times greater, at least 40 times greater, or at least 50 times greater than the number average molecular weight of each of the first elastomeric prepolymer and the second elastomeric prepolymer.

A third elastomeric prepolymer can have a number average molecular weight, for example, from 50,000 Da to 500,000 Da, from 75,000 Da to 400,000 Da, or from 100,000 Da to 300,000 Da, where the number average molecular weight is determined using gel permeation chromatography. A third elastomeric prepolymer can have a number average molecular weight, for example, greater than 50,000 Da, greater than 75,000 Da, greater than 100,000 Da, greater than 200,000 Da, greater than 300,000 Da, or greater than 400,000 Da, where the number average molecular weight is determined using gel permeation chromatography. A third elastomeric prepolymer can have a number average molecular weight, for example, less than 500,000 Da, less than 400,000 Da, less than 300,000 Da, less than 200,000 Da, or less than 100,000 Da, where the number average molecular weight is determined using gel permeation chromatography.

A third elastomeric prepolymer can have any suitable elastomeric backbone. In addition to any of those described herein, the third elastomeric prepolymer can have a polysiloxane backbone.

A third elastomeric prepolymer such as a polysiloxane prepolymer can comprise a polysiloxane backbone having the structure of Formula (10):

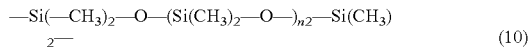

—Si(—CH$_3$)$_2$—O—(Si(CH$_3$)$_2$—O—)$_{n2}$—Si(CH$_3$)$_2$— (10)

where n2 is an integer, for example, from about 1,500 to about 2,500.

A third elastomeric prepolymer can comprise functional groups that are or are not reactive with the functional groups of each of the first elastomeric prepolymer and/or the second elastomeric prepolymer.

A third elastomeric prepolymer can have functional groups such that the reaction rate of the third elastomeric prepolymer with the first elastomeric prepolymer and/or the second elastomeric prepolymer is slower than a reaction rate between the first elastomeric prepolymer and/or the second elastomeric prepolymer. That is, the reaction between the first and second elastomeric prepolymers can proceed at a faster rate that the reaction between the third elastomeric prepolymer and the first and second elastomeric prepolymers such that the reactive functional groups of the first and second elastomeric prepolymers are bound and not available for reacting with the third elastomeric prepolymer. A third elastomeric prepolymer can react with the reaction product of a reaction between the first elastomeric prepolymer and the second elastomeric prepolymer. For example, the third elastomeric prepolymer can comprise silanol functional groups, the first elastomeric prepolymer can comprise isocyanate groups, and the second elastomeric prepolymer can comprise amine groups.

A third elastomeric prepolymer may not react with the first and second elastomeric prepolymers.

A third elastomeric prepolymer can react with the first and second elastomeric prepolymers.

A reactive third elastomeric prepolymer can the same functional reactive groups as the first elastomeric prepolymer and/or second elastomeric prepolymer or can have different reactive functional groups.

A third elastomeric prepolymer can have a reactive functionality, for example, from 2 to 6, such as 2, 3, 4, 5, or 6. For example, a polysiloxane prepolymer can have a reactive functionality of 2.

A third elastomeric prepolymer can have a single reactive functionality or can comprise a combination of prepolymers such as polysiloxane prepolymers having different reactive functionalities. For example, a third elastomeric prepolymer can have an average reactive functionality from 2.1 to 5.9, such as from 2.15 to 4, from 2.2 to 3, or from 2.3 to 2.6.

An elastomeric prepolymer can have a glass transition temperature $T_g$, for example, less than $-20°$ C., less than $-30°$ C., or less than $-40°$ C., where the glass transition temperature $T_g$ is determined by Dynamic Mass Analysis (DMA) using a TA Instruments Q800 apparatus with a frequency of 1 Hz, an amplitude of 20 microns, and a temperature ramp of $-80°$ C. to 25° C., with the $T_g$ identified as the peak of the tan δ curve.

An elastomeric prepolymer can exhibit a viscosity at 25° C., for example, within a range from 20 poise to 500 poise (2 Pa-sec to 50 Pa-sec), from 20 poise to 200 poise (2 Pa-sec to 20 Pa-sec) or from 40 poise to 120 poise (4 Pa-sec to 12 Pa-sec), measured using a Brookfield CAP 2000 viscometer, with a No. 6 spindle, at speed of 300 rpm, and at a temperature of 25° C.

A coreactive composition provided by the present disclosure can be prepared by combining a first component and a second component. The first component can comprise the first prepolymer and the second component can comprise the second prepolymer, where the first and second prepolymers can coreact. The third prepolymer can be included in the first component and or the second component. For certain curing chemistries in which the first and second prepolymers are only coreactive in the presence of a catalyst, a cure accelerator, and/or a polymerization initiator such as a photoinitiator, a first component can comprise both the first and second prepolymers, and the second component can comprise the catalyst, cure accelerator and/or the polymerization initiator. The third elastomeric prepolymer can included in the first and/or second components.

A coreactive composition can be prepared by combing a first component, a second component, and one or more additional components. In such cases, the first and/or second component can comprise the first and/or second prepolymer, and one of the additional components can comprise the third elastomeric prepolymer.

A coreactive composition provided by the present disclosure can comprise, for example, from 80 mol % to 98 mol % of the combination of the first elastomeric prepolymer and the second elastomeric prepolymer, from 82 mol % to 96 mol %, from 84 mol % to 94 mol %, from 86 mol % to 92 mol %, or from 88 mol % to 90 mol %, of the combination of the first elastomeric prepolymer and the second elastomeric prepolymer, where mol % is based on the total moles of the first elastomeric prepolymer, the second elastomeric prepolymer, and the third elastomeric prepolymer in the coreactive composition. A coreactive composition can comprise, for example, less than 98 mol % of the combination of the first elastomeric prepolymer and the second elastomeric prepolymer, less than 96 mol %, less than 92 mol %, less than 88 mol %, less than 86 mol %, or less than 82 mol %, of the combination of the first elastomeric prepolymer and the second elastomeric prepolymer, where mol % is based on the total moles of the first elastomeric prepolymer, the second elastomeric prepolymer, and the third elastomeric prepolymer in the coreactive composition. A coreactive composition can comprise, for example, greater than 80 mol % of the combination of the first elastomeric prepolymer and the second elastomeric prepolymer, greater than 84 mol %, greater than 88 mol %, greater than 92 mol %, or greater than 96 mol % of the combination of the first elastomeric prepolymer and the second elastomeric prepolymer, where mol % is based on the total moles of the first elastomeric prepolymer, the second elastomeric prepolymer, and the third elastomeric prepolymer in the coreactive composition.

A coreactive composition can comprise, for example, from 2 mol % to 20 mol % of the third elastomeric prepolymer, from 4 mol % to 18 mol %, from 6 mol % to 16 mol %, or from 8 mol % to 12 mol % of the third elastomeric prepolymer, where mol % is based on the total moles of the first elastomeric prepolymer, the second elastomeric prepolymer, and the third elastomeric prepolymer in the coreactive composition. A coreactive composition can comprise, for example, less than 20 mol % of the third elastomeric prepolymer, less than 16 mol %, less than 12 mol %, less than 8 mol %, or less than 4 mol % of the third elastomeric prepolymer, where mol % is based on the total moles of the first elastomeric prepolymer, the second elastomeric prepolymer, and the third elastomeric prepolymer in the coreactive composition. A coreactive composition can comprise, for example, greater than 2 mol % of the third elastomeric prepolymer, greater than 6 mol %, greater than 10 mol %, or greater than 14 mol % of the third elastomeric prepolymer, where mol % is based on the total moles of the first elastomeric prepolymer, the second elastomeric prepolymer, and the third elastomeric prepolymer in the coreactive composition.

Coreactive compositions are thermosetting compositions and when cured form thermosets.

A coreactive composition can be substantially free of solvent. For example, a coreactive composition can comprise less than 5 wt % solvent, less than 2 wt %, less than 1 wt %, or less than 0.1 wt % solvent, where wt % is based on the total weight of the coreactive composition.

A coreactive composition can comprise coreactive compounds that coreact and cure at room temperature, where room temperature refers to a temperature from 20° C. to 25° C., from 20° C. to 22° C., or about 20° C.

In compositions provided by the present disclosure can comprise, the first elastomeric prepolymer can comprise a polyisocyanate elastomeric prepolymer, the second elastomeric prepolymer can comprise a polyamine elastomeric prepolymer, and the third elastomeric prepolymer can comprise silanol-functional prepolymer.

In compositions provided by the present disclosure, the first elastomeric prepolymer can comprise a polyether prepolymer, the second elastomeric prepolymer can comprise a polyether prepolymer and/or a polybutadiene prepolymer, and the third elastomeric prepolymer can comprise a polysiloxane prepolymer.

In compositions provided by the present disclosure, the first elastomeric prepolymer can comprise an amine-functional polyether prepolymer, the second elastomeric prepolymer can comprise an isocyanate-functional polyether prepolymer and/or an isocyanate-functional polybutadiene prepolymer, and the third elastomeric prepolymer can comprise a silanol-functional polysiloxane prepolymer.

Each of the first elastomeric prepolymer and the second elastomeric prepolymer can independently be selected from, for example, a polypropylene glycol, a polybutadiene, a polycarbonate, and a polytetrahydrofuran, and can have a number average molecular weight, for example, from 1,000 Da to 20,000 Da, such as from 500 Da to 5,000 Da, from 500 Da to 4,000 Da, from 500 Da to 3,500 Da, or from 500 Da to 3,000 Da. Each of the first elastomeric prepolymer and the second elastomeric prepolymer can independently be selected from, for example, a polypropylene glycol, a polybutadiene, a polycarbonate, and a polytetrahydrofuran, and can have a number average molecular weight, for example, less than 20,000 Da, less than 10,000 Da, less than 5,000 Da, less than 4,000 Da, less than 3,500 Da, less than 3,000 Da, or less than 2,000 Da.

In addition to a first, second and third elastomeric prepolymer, a coreactive composition provided by the present disclosure can comprise a monomer or a combination of monomers. For example, a monomer refers to a low molecular weight compound that does not have repeat units.

A monomer refers to a low molecular weight compound that does not comprise repeat units. A monomer can have a molecular weight, for example, less than 1,000 Da, less than 800 Da less than 600 Da, less than 500 Da, less than 400 Da, or less than 300 Da. A monomer can have a molecular weight, for example, from 100 Da to 1,000 Da, from 100 Da to 800 Da, from 100 Da to 600 Da, from 150 Da, to 550 Da, or from 200 Da to 500 Da. A monomer can have a molecular weight, for example, greater than 100 Da, greater than 200 Da, greater than 300 Da, greater than 400 Da, greater than 500 Da, greater than 600 Da, or greater than 800 Da.

A monomer can be reactive with the first elastomeric prepolymer and/or with the second elastomeric prepolymer. A monomer can be reactive with the third elastomeric prepolymer.

A monomer can have the same reactive functional groups as the first elastomeric prepolymer, the second elastomeric prepolymer, and/or the third elastomeric prepolymer.

A monomer can comprise any suitable functional group such as, for example, thiol, alkenyl, alkynyl, epoxy, isocyanate, hydroxyl, amine, Michael acceptor, Michael donor group, silanol, polyalkoxysilyl, or other suitable reactive group. A functional group of a monomer can be selected as appropriate for a particular coreactive curing chemistry.

A monomer can comprise a polythiol, a polyalkenyl, a polyalkynyl, a polyepoxide, a polyfunctional Michael acceptor, a polyisocyanate, a polyol, a polyamine, a polysilanol, a polyfunctional polyalkoxysilyl, or a combination of any of the foregoing.

A monomer can comprise, for example, a diamine such as a primary diamine, a secondary diamine, a tertiary diamine, or a combination of any of the foregoing.

Examples of suitable primary diamines include ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane (isophorone diamine or IPDA), 2,4- and/or 2,6-hexahydrotoluylene diamine, 2,4'-diaminodicyclohexyl methane, 4,4'-diaminodicyclohexyl methane, 3,3'-dialkyl-4, 4'-diaminodicyclohexyl methanes such as 3,3'-dimethyl-4,4'-diaminodicyclohexyl methane, and 3,3'-diethyl-4,4'-diaminodicyclohexyl methane, 2,4- and/or 2,6-diaminotoluene, 3,5-diethyltoluene-2,4-diamine, 3,5-diethyltoluene-2,6-diamine, 3,5-dimethylthio-2,4-toluenediamine, 3,5-dimethylthio-2,4-toluenediamine, 2,4'- and/or 4,4'-diaminodiphenyl methane, dipropylene triamine, bis hexamethylene triamine, or combinations of any of the foregoing.

Examples of suitable secondary diamines include 4,4'-methylenebis(N-(sec-butyl)cyclohexan-1-amine), N-isopropyl-3-((isopropylamino)methyl)-3,5,5-trimethylcyclohexan-1-amine, include cycloaliphatic secondary diamines available under the Jefflink® tradename from Huntsman Corporation, the Clearlink® tradename from Dorf-Ketal Chemicals, LLC, and the Desmophen® tradename from Covestro LLC, or a combination of any of the foregoing.

A monomer can comprise, for example, an aromatic polyamine, an aliphatic polyamine, a cycloaliphatic polyamine, or a combination of any of the foregoing.

A monomer can comprise a diisocyanate such as an aliphatic diisocyanate, a cycloaliphatic diisocyanate, an aromatic diisocyanate, or a combination of any of the foregoing.

Examples of suitable aliphatic diisocyanates include 1,6-hexamethylene diisocyanate, 1,5-diisocyanato-2-methylpentane, methyl-2,6-diisocyanatohexanoate, bis(isocyanatomethyl)cyclohexane, 1,3-bis(isocyanatomethyl)cyclohexane, 2,2,4-trimethylhexane 1,6-diisocyanate, 2,4,4-trimethylhexane 1,6-diisocyanate, 2,5(6)-bis(isocyanatomethyl)cyclo[2.2.1]heptane, 1,3,3-trimethyl-1-(isocyanatomethyl)-5-isocyanatocyclohexane, 1,8-diisocyanato-2,4-dimethyloctane, octahydro-4,7-methano-1H-indenedimethyl diisocyanate, and 1,1'-methylenebis(4-isocyanatocyclohexane), and 4,4-methylene dicyclohexyl diisocyanate) (H$_{12}$MDI). Examples of suitable aromatic diisocyanates include 1,3-phenylene diisocyanate, 1,4-phenylene diisocyanate, 2,6-toluene diisocyanate (2,6-TDI), 2,4-toluene diisocyanate (2,4-TDI), a blend of 2,4-TDI and 2,6-TDI, 1,5-diisocyanatonaphthalene, diphenyl oxide 4,4'-diisocyanate, 4,4'-methylenediphenyl diisocyanate (4,4-MDI), 2,4'-methylenediphenyl diisocyanate (2,4-MDI), 2,2'-diisocyanatodiphenylmethane (2,2-MDI), diphenylmethane diisocyanate (MDI), 3,3'-dimethyl-4,4'-biphenylene isocyanate, 3,3'-dimethoxy-4,4'-biphenylene diisocyanate, 1-[(2,4-diisocyanatophenyl)methyl]-3-isocyanato-2-methyl benzene, 2,4,6-triisopropyl-m-phenylene diisocyanate, and combinations of any of the foregoing.

Examples of suitable cycloaliphatic diisocyanates include isophorone diisocyanate, cyclohexane diisocyanate, methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane, 2-isocyanatomethyl-2-(3-isocyanatopropyl)-6-(2-isocyanatoethyl)-bicyclo[2.2.1]-heptane, and combinations of any of the foregoing.

Examples of suitable aromatic diisocyanates include bis(isocyanatoethyl)benzene, α,α,α',α'-tetramethylxylene diisocyanate, 1,3-bis(1-isocyanato-1-methylethyl)benzene, bis(isocyanatobutyl)benzene, bis(isocyanatomethyl)naphthalene, bis(isocyanatomethyl)diphenyl ether, bis(isocyanatoethyl)phthalate, and 2,5-di(isocyanatomethyl)furan. Aromatic diisocyanates having isocyanate groups bonded directly to the aromatic ring include phenylene diisocyanate, ethylphenylene diisocyanate, isopropylphenylene diisocyanate, dimethylphenylene diisocyanate, diethylphenylene diisocyanate, diisopropylphenylene diisocyanate, naphthalene diisocyanate, methylnaphthalene diisocyanate, biphenyl diisocyanate, 4,4'-diphenylmethane diisocyanate, bis(3-methyl-4-isocyanatophenyl)methane, bis(isocyanatophenyl)ethylene, 3,3''-dimethoxy-biphenyl-4,4'-diisocyanate, diphenylether diisocyanate, bis(isocyanatophenylether)ethyleneglycol, bis(isocyanatophenylether)-1,3-propyleneglycol, benzophenone diisocyanate, carbazole diisocyanate, ethylcarbazole diisocyanate, dichlorocarbazole diisocyanate, 4,4'-diphenylmethane diisocyanate, p-phenylene diisocyanate, 2,4-toluene diisocyanate, and 2,6-toluene diisocyanate, and combinations of any of the foregoing.

An amine-functional coreactive component may also include a monomeric aliphatic secondary amine such as Clearlink® 1000, available from Dor-Ketal Chemicals, LLC.

For example, a monomeric polyamine can have the structure of Formula (11):

$$HN(-R^6)-R^4-NH(-R^6) \quad (11)$$

wherein,
each $R^6$ is independently selected from hydrogen and $C_{1-10}$ alkyl; and
$R^4$ is selected from $C_{1-20}$ alkane-diyl and $C_{6-20}$ alkanecycloalkane-diyl.

In polyamines of Formula (11), each $R^6$ can be hydrogen.
In polyamines of Formula (11), each $R^6$ can be $C_{1-10}$ alkyl, $C_{1-8}$ alkyl, $C_{1-6}$ alkyl, $C_{1-4}$ alkyl, or $C_{1-2}$ alkyl.
In polyamines of Formula (11), $R^4$ can be $C_{1-20}$ alkane-diyl, $C_{1-20}$ alkane-diyl, $C_{1-16}$ alkane-diyl, $C_{1-14}$ alkane-diyl, $C_{1-12}$ alkane-diyl, or $C_{1-10}$ alkane-diyl.
In polyamines of Formula (11), $R^4$ can be $C_{6-20}$ alkanecycloalkane-diyl, $C_{6-16}$ alkanecycloalkane-diyl, $C_{6-14}$ alkanecycloalkane-diyl, $C_{6-12}$ alkanecycloalkane-diyl, or $C_{6-10}$ alkanecycloalkane-diyl.

In polyamines of Formula (11), $R^4$ can have the structure of Formula (12):

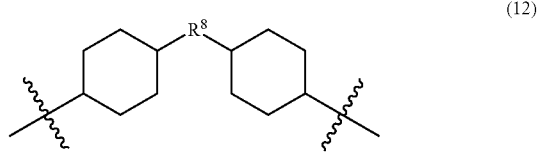

(12)

where $R^8$ is $C_{1-10}$ alkane-diyl, such as $C_{1-8}$ alkane-diyl, $C_{1-6}$ alkane-diyl, $C_{1-4}$ alkane-diyl, or $C_{1-2}$ alkane-diyl.

In moieties of Formula (12), $R^8$ can be methane-diyl, ethane-diyl, or propane-diyl.

The monomeric polyamine can comprise 4,4'-methylenebis(N-(sec-butyl)cyclohexan-1-amine), N-isopropyl-3-((isopropylamino)methyl)-3,5,5-trimethylcyclohexan-1-amine, and a combination thereof.

The monomeric amines may be monoamines, or polyamines such as diamines, triamines, higher polyamines and/or mixtures thereof. The monomeric amines also may be aromatic or aliphatic such as cycloaliphatics. Examples of suitable aliphatic polyamines include, ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotolulene diamine, 2,4'- and/or 4,4'-di amino-dicyclohexyl methane, 5-amino-1,3,3-trimethylcyclohexanemethylamine (isophoronediamine), 1,3-cyclohexanebis(methylamine) (1,3 BAC), and 3,3'-dialkyl-4,4'-diaminodicyclohexyl methanes (such as 3,3'-dimethyl-4,4'-diaminodicyclohexyl methane and 3,3'-diethyl-4,4'-diaminodicyclohexyl methane), 2,4- and/or 2,6-diaminotoluene and 2,4'- and/or 4,4'-diaminodiphenyl methane, or mixtures thereof.

A monomer can have a reactive functionality of two or more, for example, from 2 to 6, from 2 to 5, or from 2 to 4. A monomer can have a reactive functionality of 2, 3, 4, 5, 6, or a combination of any of the foregoing. A monomer can have an average reactive functionality, for example, from 2 to 6, from 2 to 5, from 2 to 4, from 2 to 3, from 2.1 to 2.8, or from 2.2 to 2.6.

A coreactive composition provided by the present disclosure can comprise, for example, from 2 wt % to 15 wt % of a monomer, from 4 wt % to 13 wt %, or from 6 wt % to 11 wt % of a monomer, where wt % is based on the total weight of the composition. A composition provided by the present disclosure can comprise, for example, greater than 2 w % of a monomer, greater than 6 wt %, greater than 10 wt %, or greater than 14 wt % of a monomer, where wt % is based on the total weight of the coreactive composition. A coreactive composition provided by the present disclosure can comprise, for example, less than 15 w % of a monomer, less than 11 wt %, lesser than 7 wt %, or less than 14 wt % of a monomer, where wt % is based on the total weight of the coreactive composition.

A coreactive composition can comprise one or more additives. Examples of suitable additives include catalysts, polymerization initiators, adhesion promoters, surfactant, dispersant, reactive diluents, plasticizers, filler, colorants, photochromic agents, rheology modifiers, corrosion inhibitors, fire retardants, UV absorbers, thermal stabilizers, and combinations of any of the foregoing.

Compositions provided by the present disclosure can comprise a filler or a combination of filler.

A coreactive composition provided by the present disclosure can comprise, for example, from 1 wt % to 90 wt % of low-density filler, from 1 wt % to 60 wt %, from 1 wt % to 40 wt %, from 1 wt % to 20 wt %, from 1 wt % to 10 wt %, or from 1 wt % to 5 wt % of low-density filler, where wt % is based on the total weight of the coreactive composition.

A coreactive composition provided by the present disclosure can comprise greater than 1 wt % low density filler, greater than 1 wt %, greater than 2 wt %, greater than 3 wt %, greater than 4 wt %, greater than 1 wt %, or greater than 10 wt % low-density filler, where wt % is based on the total weight of the coreactive composition.

A coreactive composition provided by the present disclosure can comprise from 1 vol % to 90 vol % low-density filler, from 5 vol % to 70 vol %, from 10 vol % to 60 vol %, from 20 vol % to 50 vol %, or from 30 vol % to 40 vol % low density filler, where vol % is based on the total volume of the coreactive composition.

A coreactive composition can comprise greater than 1 vol % low-density filler, greater than 5 vol %, greater than 10 vol %, greater than 20 vol %, greater than 30 vol %, greater than 40 vol %, greater than 50 vol %, greater than 60 vol %, greater than 70 vol %, or greater than 80 vol % low-density filler, where vol % is based on the total volume of the coreactive composition.

A coreactive composition provided by the present disclosure can comprise, for example, from 30 wt % to 60 wt % of a filler, from 35 wt % to 55 wt %, or from 40 wt % to 50 wt %, of a filler, where wt % is based on the total weight of the coreactive composition. A coreactive composition provided by the present disclosure can comprise, for example, greater than 35 wt %, greater than 40 wt %, greater than 45 wt %, greater than 50 wt %, or greater than 55 wt % of a filler, where wt % is based on the total weight of the coreactive composition. A coreactive composition provided by the present disclosure can comprise, for example, less than 60 wt %, less than 55 wt %, less than 50 wt %, or less than 45 wt % of a filler, where wt % is based on the total weight of the coreactive composition.

A filler can comprise an organic filler, an inorganic filler, a low-density filler, or a combination of any of the foregoing.

An inorganic filler can be included to provide mechanical reinforcement and to control the rheological properties of the composition. Inorganic filler may be added to compositions to impart desirable physical properties such as, for example, to increase the impact strength, to control the viscosity, or to modify the electrical properties of a cured composition.

Examples of suitable inorganic filler include carbon black, calcium carbonate, precipitated calcium carbonate, calcium hydroxide, hydrated alumina (aluminum hydroxide), talc, mica, titanium dioxide, alumina silicate, carbonates, chalk, silicates, silica, precipitated silica, fumed silica, hydrophobic silica, hydrophilic silica, glass, metal oxides, graphite, and combinations of any of the foregoing.

Examples of suitable calcium carbonate filler include products such as Socal® 31, Socal® 312, Socal® U1S1, Socal® UaS2, Socal® N2R, Winnofil® SPM, and Winnofil® SPT available from Solvay Special Chemicals. A calcium carbonate filler can include a combination of precipitated calcium carbonates.

Inorganic filler can be surface treated to provide hydrophobic or hydrophilic surfaces that can facilitate dispersion and compatibility of the inorganic filler with other components of a coreactive composition. An inorganic filler can include surface-modified particles such as, for example, surface modified silica. The surface of silica particles can be modified, for example, to be tailor the hydrophobicity or hydrophilicity of the surface of the silica particle. The surface modification can affect the dispensability of the particles, the viscosity, the curing rate, and/or the adhesion.

A coreactive composition can comprise an organic filler or a combination of organic filler.

Organic filler can be selected to have a low specific gravity and to be resistant to solvents and/or to reduce the density of the composition. An organic filler can include solid powders or particles, hollow powders or particles, and combinations of any of the foregoing.

An organic filler can have a specific gravity, for example, less than 1.15, less than 1.1, less than 1.05, less than 1, less than 0.95, less than 0.9, less than 0.8, or less than 0.7. Organic filler can have a specific gravity, for example, from 0.85 to 1.15, within a range from 0.9 to 1.1, within a range from 0.9 to 1.05, or from 0.85 to 1.05. Specific gravity can be determined according to ISO 787-11.

Organic filler can comprise thermoplastics, thermosets, or a combination thereof. Examples of suitable thermoplastics and thermosets that can be used as organic filler include epoxies, epoxy-amides, ethylene tetrafluoroethylene copolymers, nylons, polyethylenes, polypropylenes, polyethylene oxides, polypropylene oxides, polyvinylidene chlorides, polyvinylfluorides, tetrafluoroethylene, polyamides, polyimides, ethylene propylenes, perfluorohydrocarbons, fluoroethylenes, polycarbonates, polyetherimides, polyetheretherketones, polyetherketones, polyphenylene oxides, polyphenylene sulfides, polystyrenes, polyvinyl chlorides, melamines, polyesters, phenolics, epichlorohydrins, fluorinated hydrocarbons, polycyclics, polybutadienes, polychloroprenes, polyisoprenes, polysulfides, polyurethanes, isobutylene isoprenes, silicones, styrene butadienes, liquid crystal polymers, and combinations of any of the foregoing.

Examples of suitable polyamide 6 and polyamide 12 particles are available from Toray Plastics as grades SP-500, SP-10, TR-1, and TR-2. Suitable polyamide powders are also available from the Arkema Group under the tradename Orgasol®, and from Evonik Industries under the tradename Vestosin®.

A coreactive composition provided by the present disclose can comprise micronized oxidized polyethylene homopolymer. An organic filler can include a polyethylene, such as an oxidized polyethylene powder. Suitable polyethylenes are available, for example, from Honeywell International, Inc. under the tradename ACumist®, from INEOS under the tradename Eltrex®, and Mitsui Chemicals America, Inc. under the tradename Mipelon®. Particulate copolymers of polyethylene and polypropylene with a volume average particle size of 5.0 µm to 7.5 µm, available from Baker Hughes, Inc. as Petrolite®, such as Petrolite® 5000 T6, may also be used.

An organic filler can have any suitable shape. For example, an organic filler can comprise fractions of crushed polymer that has been filtered to select a desired size range. An organic filler can comprise substantially spherical particles. A substantially spherical particle can refer to a particle in which the ratio of the largest dimension to the smallest dimension is less than 2. Particles can be solid or can be porous.

An organic filler can have an average volume particle size, for example, within a range from 1 µm to 100 µm, 2 µm to 40 µm, from 2 µm to 30 µm, from 4 µm to 25 µm, from 4 µm to 20 µm, from 2 µm to 12 µm, or from 5 µm to 15 µm. An organic filler can have an average volume particle size, for example, less than 100 µm, less than 75 µm, less than 50 µm, less than 40 µm, or less than 20 µm. Particle size distribution can be determined using a Fischer Sub-Sieve Sizer or by optical inspection.

An organic filler can include a low-density such as a modified, expanded thermoplastic microcapsules. Suitable modified expanded thermoplastic microcapsules can include an exterior coating of a melamine or urea/formaldehyde resin.

A coreactive composition can comprise a low-density filler or combination of low-density filler such as low-density microcapsules. A low-density microcapsule can comprise a thermally expandable microcapsule.

A thermally expandable microcapsule refers to a hollow shell comprising a volatile material that expands at a predetermined temperature. Thermally expandable thermoplastic microcapsules can have an average initial particle size of 5 µm to 70 µm, in some cases 10 µm to 24 µm, or from 10 µm to 17 µm. The term "average initial particle size" refers to the average particle size (numerical weighted average of the particle size distribution) of the microcapsules prior to any expansion. The particle size distribution can be determined using a Fischer Sub-Sieve Sizer or by optical inspection.

Examples of materials suitable for forming the wall of a thermally expandable microcapsule include polymers of vinylidene chloride, acrylonitrile, styrene, polycarbonate, methyl methacrylate, ethyl acrylate, and vinyl acetate, copolymers of these monomers, and combinations of the polymers and copolymers. A crosslinking agent may be included with the materials forming the wall of a thermally expandable microcapsule.

Examples of suitable thermoplastic microcapsules include Expancel™ microcapsules such as Expancel™ DE microspheres available from AkzoNobel. Examples of suitable Expancel™ DE microspheres include Expancel™ 920 DE 40 and Expancel™ 920 DE 80. Suitable low-density microcapsules are also available from Kureha Corporation.

Low-density filler such as low-density microcapsules can be characterized by a specific gravity within a range from 0.01 to 0.09, from 0.04 to 0.09, within a range from 0.04 to 0.08, within a range from 0.01 to 0.07, within a range from 0.02 to 0.06, within a range from 0.03 to 0.05, within a range from 0.05 to 0.09, from 0.06 to 0.09, or within a range from 0.07 to 0.09, wherein the specific gravity is determined according to ISO 787-11. Low-density filler such as low-density microcapsules can be characterized by a specific gravity less than 0.1, less than 0.09, less than 0.08, less than 0.07, less than 0.06, less than 0.05, less than 0.04, less than 0.03, or less than 0.02, wherein the specific gravity is determined according to ISO 787-11.

Low-density filler such as low-density microcapsules can be characterized by a mean particle diameter from 1 µm to 100 µm and can have a substantially spherical shape. Low-density filler such as low-density microcapsules can be characterized, for example, by a mean particle diameter from 10 µm to 100 µm, from 10 µm to 60 µm, from 10 µm to 40 µm, or from 10 µm to 30 µm, as determined according to ISO 787-11

Low-density filler such as low-density microcapsules can comprise expanded microcapsules or microballoons having a coating of an aminoplast resin such as a melamine resin. Aminoplast resin-coated particles are described, for example, in U.S. Pat. No. 8,993,691. Such microcapsules can be formed by heating a microcapsule comprising a blowing agent surrounded by a thermoplastic shell. Uncoated low-density microcapsules can be reacted with an aminoplast resin such as a urea/formaldehyde resin to provide a coating of a thermoset resin on the outer surface of the particle.

With the coating of an aminoplast resin, an aminoplast-coated microcapsule can be characterized by a specific gravity, for example, within a range from 0.02 to 0.08, from 0.02 to 0.07, from 0.02 to 0.06, from 0.03 to 0.07, from 0.03 to 0.065, from 0.04 to 0.065, from 0.045 to 0.06, or from 0.05 to 0.06, wherein the specific gravity is determined according to ISO 787-11.

A coreactive composition can comprise, for example, from 1 wt % to 90 wt % of low-density filler, from 1 wt % to 60 wt %, from 1 wt % to 40 wt %, from 1 wt % to 20 wt %, from 1 wt % to 10 wt %, or from 1 wt % to 5 wt % of low-density filler, where wt % is based on the total weight of the coreactive composition.

A coreactive composition can comprise greater than 1 wt % low density filler, greater than 1 wt %, greater than 2 wt %, greater than 3 wt %, greater than 4 wt %, greater than 1 wt %, or greater than 10 wt % low-density filler, where wt % is based on the total weight of the coreactive composition.

A coreactive composition can comprise from 1 vol % to 90 vol % low-density filler, from 5 vol % to 70 vol %, from 10 vol % to 60 vol %, from 20 vol % to 50 vol %, or from 30 vol % to 40 vol % low density filler, where vol % is based on the total volume of the coreactive composition.

A coreactive composition can comprise greater than 0.1 vol %, greater than 1 vol % low-density filler, greater than 5 vol %, greater than 10 vol %, greater than 20 vol %, greater than 30 vol %, greater than 40 vol %, greater than 50 vol %, greater than 60 vol %, greater than 70 vol %, or greater than 80 vol % low-density filler, where vol % is based on the total volume of the coreactive composition.

A coreactive composition provided by the present disclosure can comprise a colorant or a combination of colorants. A colorant can comprise, for example, a pigment, dye, tint, special effects colorant, or photosensitive compound.

Examples of suitable colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the compositions by grinding or simple mixing.

Examples of suitable pigments and/or pigment compositions include carbazole dioxazine crude pigment, azo, monoazo, disazo, benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and/or fillers and mixtures thereof.

Examples of suitable dyes include those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Examples of suitable tints include pigments dispersed in water-based or water miscible carriers such as Aqua-Chem® 896 commercially available from Degussa, Inc., Charisma® Colorants and Maxitoner® Industrial Colorants commercially available from Accurate Dispersions division of Eastman Chemical, Inc.

A colorant can be in the form of a dispersion such as a nanoparticle dispersion.

A colorant can comprise, for example, a special effect colorant that produces one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. Special effect compositions can produce a color shift, such that the color of the coating changes when the coating is viewed at different angles. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

A colorant can comprise a photosensitive compound and/or photochromic compound, which reversibly alters its color when exposed to one or more light sources, can be used in the composition of the present invention. Photochromic and/or photosensitive activated can be activated by exposure to radiation of a specified wavelength.

A coreactive composition provided by the present disclosure can comprise, for example, from 0.1 wt % to 1 wt % of a colorant, from 0.15 wt % to 0.8 wt %, from 0.2 wt % to 0.6 wt %, or from 0.3 wt % to 0.5 wt %, of a colorant, where wt % is based on the total weight of the coreactive composition. A coreactive composition provided by the present disclosure can comprise, for example, greater than 0.1 wt %, greater than 0.2 wt %, greater than 0.3 wt %, or greater than 0.5 wt % of a colorant, where wt % is based on the total weight of the coreactive composition. A coreactive composition provided by the present disclosure can comprise, for example, less than 1 wt %, less than 0.8 wt %, less than 0.6 wt %, less than 0.4 wt %, or less than 0.2 wt % of a colorant, where wt % is based on the total weight of the coreactive composition.

A coreactive composition provided by the present disclosure can comprise a surfactant or a combination of surfactants.

A surfactant/dispersant can comprise, for example, BYK®-9077 available from BYK.

A coreactive composition can include a catalyst or a combination of catalysts.

A catalyst or combination of catalysts can be selected to catalyze the reaction of co-reactants in the coreactive composition such as the reaction of the first elastomeric prepolymer and the second elastomeric prepolymer. The appropriate catalyst will depend on the curing chemistry. For example, a thiol-ene or thiol epoxy can comprise an amine catalyst.

A coreactive composition can comprise, for example, from 0.1 wt % to 1 wt %, from 0.2 wt % to 0.9 wt %, from 0.3 wt % to 0.7 wt %, or from 0.4 wt % to 0.6 wt % of a catalyst or combination of catalysts, where wt % is based on the total weight of the coreactive composition.

A catalyst can include a latent catalyst or combination of latent catalysts. Latent catalysts include catalysts that have little or no activity until released or activated, for example, by physical and/or chemical mechanisms. Latent catalysts may be contained within a structure or may be chemically blocked. A controlled release catalyst may release a catalyst upon exposure to ultraviolet radiation, heat, ultrasonication, or moisture. A latent catalyst can be sequestered within a core-shell structure or trapped within a matrix of a crystalline or semi-crystalline polymer where the catalyst can diffuse from the encapsulant with time or upon activation such as by the application of thermal or mechanical energy.

A coreactive composition can comprise a dark cure catalyst or a combination of dark cure catalysts. A dark cure catalyst refers to a catalyst capable of generating free radicals without being exposed to electromagnetic energy.

Dark cure catalysts include, for example, combinations of metal complexes and organic peroxides, tialkylborane complexes, and peroxide-amine redox initiators. A dark cure catalyst can be used in conjunction with a photopolymerization initiator or independent of a photopolymerization initiator.

A coreactive composition based on thiol/thiol curing chemistries can comprise a cure activator or a combination of cure activators to initiate the thiol/thiol polymerization reaction. Cure activators can be used for example in coreactive compositions in which both the first and second elastomeric prepolymers comprise thiol functional groups.

A cure activator can comprise an oxidizing agent capable of oxidizing terminal mercaptan groups to form disulfide bonds. Examples of suitable oxidizing agents include lead dioxide, manganese dioxide, calcium dioxide, sodium perborate monohydrate, calcium peroxide, zinc peroxide, and dichromate.

A cure activator can comprise an inorganic activator, an organic activator, or a combination thereof.

Examples of suitable inorganic activators include metal oxides. Examples of suitable metal oxide activators include zinc oxide (ZnO), lead oxide (PbO), lead peroxide (PbO$_3$), manganese dioxide (MnO$_2$), sodium perborate (NaBO$_3$·H$_2$O), potassium permanganate (KMnO$_4$), calcium peroxide (CaCO$_3$), barium peroxide (BaO$_3$), cumene hydroperoxide, and combinations of any of the foregoing. A cure activator can be MnO$_2$.

A coreactive composition based on a thiol/thiol curing chemistry can comprise, for example, from 1 wt % to 10 wt % of a cure activator or combination of cure activators, wherein wt % is based on the total weight of the coreactive composition. For example, a coreactive composition can comprise from 1 wt % to 9 wt %, from 2 wt % to 8 wt %, from 3 wt % to 7 wt %, or from 4 wt % to 6 wt % of an activator or a combination of cure activators, wherein wt % is based on the total weight of the coreactive composition. For example, a coreactive composition can comprise greater than 1 wt % of a cure activator or a combination of cure activators, greater than 2 wt %, greater than 3 wt %, greater than 4 wt %, greater than 5 wt %, or greater than 6 wt % of a cure activator or combination of cure activators, wherein wt % is based on the total weight of the coreactive composition.

A coreactive composition based on a thiol/thiol curing chemistry can include a cure accelerator or combination of cure accelerators.

A cure accelerator can act as sulfur donors to generate active sulfur fragments capable of reacting with the terminal thiol groups of a thiol-terminated polysulfide prepolymer.

Examples of suitable cure accelerators include thiazoles, thiurams, sulfenamides, guanidines, dithiocarbamates, xanthates, thioureas, aldehydeamines, and combinations of any of the foregoing.

A cure accelerator can be thiuram polysulfide, a thiuram disulfide, or a combination thereof.

Examples of other suitable cure accelerators also include triazines and sulfides or metallic and amine salts of dialkyldithiophosphoric acids and dithiophosphates such as triazines and sulfides or metallic and amine salts of dialkyldithiophosphoric acids, and combinations of any of the foregoing. Examples of non-sulfur-containing cure accelerators include tetramethyl guanidine (TMG), di-o-tolyl guanidine (DOTG), sodium hydroxide (NaOH), water and bases.

A coreactive composition can comprise, for example, from 0.01 wt % to 2 wt % of a cure accelerator or combination of cure accelerators, from 0.05 wt % to 1.8 wt %, from 0.1 wt % to 1.6 wt %, or from 0.5 wt % to 1.5 wt % of a cure accelerator or combination of cure accelerators, where wt % is based on the total weight of the coreactive composition. A coreactive composition can comprise, for example, less than 2 wt %, less than 1.8 wt %, less than 1.6 wt %, less than 1.4 wt %, less than 1.2 wt %, less than 1 wt %, less than 0.5 wt %, less than 0.1 wt %, or less than 0.05 wt % of a cure accelerator or combination of cure accelerators, where wt % is based on the total weight of the coreactive composition.

A coreactive composition can comprise one or more polymerization initiators such as one or more free radial initiators including thermally-activated free radical initiators or free radical initiators activated by actinic radiation.

A coreactive composition can be curable by actinic radiation based on thiol/alkenyl, thiol/alkynyl and alkenyl/alkenyl curing chemistries. A coreactive composition that is curable by visible or ultraviolet radiation can comprise a photopolymerization initiator or combination of photopolymerization initiators.

A coreactive composition can include a photoinitiator or combination of photoinitiators. The radiation can be actinic radiation that can apply energy effective in generating an initiating species from a photopolymerization initiator upon irradiation therewith, and widely includes α-rays, γ-rays, X-rays, ultraviolet (UV) light including UVA, UVA, and UVC spectra), visible light, blue light, infrared, near-infrared, or an electron beam. For example, the photoinitiator can be a UV photoinitiator.

Examples of suitable UV photoinitiators include α-hydroxyketones, benzophenone, α, α.-diethoxyacetophenone, 4,4-diethylaminobenzophenone, 2,2-dimethoxy-2-phenylacetophenone, 4-isopropylphenyl 2-hydroxy-2-propyl ketone, 1-hydroxycyclohexyl phenyl ketone, isoamyl p-dimethylaminobenzoate, methyl 4-dimethylaminobenzoate, methyl O-benzoylbenzoate, benzoin, benzoin ethyl ether, benzoin isopropyl ether, benzoin isobutyl ether, 2-hydroxy-2-methyl-1-phenylpropan-1-one, 2-isopropylthioxanthone, dibenzosuberone, 2,4,6-trimethylbenzoyldiphenylphosphine oxide, bisacyclophosphine oxide, benzophenone photoinitiators, oxime photoinitiators, phosphine oxide photoinitiators, and combinations of any of the foregoing.

A coreactive composition can comprise from 0.05 wt % to 5 wt %, from 0.1 wt % to 4.0 wt %, from 0.25 wt % to 3.0 wt %, from 0.5 wt % to 1.5 wt % of a photoinitiator or combination of photoinitiators, where wt % is based on the total weight of the polymerizable composition.

A coreactive composition can comprise a thermally active free radical initiator. A thermally activated free radical initiator can become activated at elevated temperature, such as at a temperature greater than 25° C.

Examples of suitable thermally activated free radical initiators include organic peroxy compounds, azobis(organonitrile) compounds, N-acyloxyamine compounds, O-imino-isourea compounds, and combinations of any of the foregoing. Examples of suitable organic peroxy compounds, that may be used as thermal polymerization initiators include peroxymonocarbonate esters, such as tertiary-butylperoxy 2-ethylhexyl carbonate and tertiarybutylperoxy isopropyl carbonate; peroxyketals, such as 1,1-di-(tert-butyl peroxy)-3,3,5-trimethylcyclohexane; peroxydicarbonate esters, such as di(2-ethylhexyl)peroxydicarbonate, di(secondary butyl)peroxydicarbonate and diisopropylperoxydicarbonate; diacyperoxides such as 2,4-dichlorobenzoyl peroxide, isobutyryl peroxide, decanoyl peroxide, lauryl peroxide, propionyl peroxide, acetyl peroxide, benzoyl peroxide, and p-chlorobenzoyl peroxide; peroxyesters such as tert-butylperoxy pivalate, tert-butylperoxy octylate, and tert-butylperoxyisobutyrate; methylethylketone peroxide, acetylcyclohexane sulfonyl peroxide, and combinations of any of the foregoing. Other examples of suitable peroxy compounds include 2,5-dimethyl-2,5-di(2-ethylhexanoylperoxy)hexane, and/or 1,1-bis(tert-butylperoxy)-3,3,5-trimethylcyclohexane. Examples of suitable azobis(organonitrile) compounds that may be used as thermal polymerization initiators include azobis(isobutyronitrile), 2,2'-azobis(2-methyl-butanenitrile), and/or azobis(2,4-dimethylvaleronitrile). A thermally activated free radical initiator can comprise 1-acetoxy-2,2,6,6-tetramethylpiperidine and/or 1,3-dicyclohexyl-O-(N-cyclohexylideneamino)-isourea.

A coreactive composition provided by the present disclosure can comprise one or more non-elastomeric prepolymers, which can be included in any suitable amount provided that the cured coreactive composition used to form an elastomeric article retains the desired elastomeric properties.

For example, a suitable non-elastomeric prepolymer can include a polythioether, a polysulfide, a polyformal, a polyisocyanate, a polyurea, polycarbonate, polyphenylene sulfide, polyethylene oxide, polystyrene, acrylonitrile-butadiene-styrene, polycarbonate, styrene acrylonitrile, poly(methylmethacrylate), polyvinylchloride, polybutadiene, polybutylene terephthalate, poly(p-phenyleneoxide), polysulfone, polyethersulfone, polyethyleneimine, polyphenylsulfone, acrylonitrile styrene acrylate, polyethylene, syndiotactic or isotactic polypropylene, polylactic acid, polyamide, ethyl-vinyl acetate homopolymer or copolymer, polyurethane, copolymers of ethylene, copolymers of propylene, impact copolymers of propylene, polyetheretherketone, polyoxymethylene, syndiotactic polystyrene (SPS), polyphenylene sulfide (PPS), liquid crystalline polymer (LCP), homo- and copolymer of butene, homo- and copolymers of hexene; or combinations of any of the foregoing.

A non-elastomeric prepolymer can be reactive with one or more of the elastomeric prepolymers or may not be reactive with the elastomeric prepolymers in the coreactive composition.

A coreactive composition provided by the present disclosure can comprise, for example, from 30 wt % to 70 wt %, from 35 wt % to 65 wt %, from 40 wt % to 60 wt %, or from 45 wt % to 55 wt %, of elastomeric prepolymers, where wt % is based on the total weight of the coreactive composition. A coreactive composition can comprise, for example, greater than 30 wt %, greater than 40 wt %, or greater than 50 wt % of elastomeric prepolymers, where wt % is based on the total weight of the coreactive composition. A coreactive composition provided by the present disclosure can comprise, for example, less than 40 wt %, less than 50 wt %, or less than 60 wt % of elastomeric prepolymers, where wt % is based on the total weight of the coreactive composition.

A coreactive composition provided by the present disclosure can comprise, for example, from 5 wt % to 25 wt % of a first elastomeric prepolymer, and from 25 wt % to 55 wt % of a second elastomeric prepolymer, where the second elastomeric prepolymer is reactive with the first elastomeric prepolymer, and wt % is based on the total weight of the coreactive composition.

A coreactive composition provided by the present disclosure can comprise, for example, from 5 wt % to 25 wt %, from 7 wt % to 23 wt %, from 9 wt % to 20 wt %, or from 11 wt % to 18 wt % of a third prepolymer or combination of third prepolymers, where wt % is based on the total weight of the coreactive composition. A coreactive composition can comprise, for example, greater than 5 wt %, greater than 7 wt %, greater than 9 wt %, greater than 11 wt %, greater than 13 wt %, greater than 15 wt %, greater than 17 wt %, greater than 19 wt %, or greater than 21 wt % of a third prepolymer or combination of third prepolymers, where wt % is based on the total weight of the coreactive composition. A coreactive composition can comprise, for example, less than 5 wt %, less than 7 wt %, less than 9 wt %, less than 11 wt %, less than 13 wt %, less than 15 wt %, less than 17 wt %, less than 19 wt %, or less than 21 wt % of a third prepolymer or combination of third prepolymers, where wt % is based on the total weight of the coreactive composition.

A coreactive composition provided by the present disclosure can comprise, for example, from 1 wt % to 15 wt %, from 3 wt % to 12 wt %, or from 5 wt % to 10 wt % of a monomer or a combination of monomers, where wt % is based on the total weight of the coreactive composition. A coreactive composition can comprise, for example, greater than 1 wt %, greater than 3 wt %, greater than 5 wt %, greater than 7 wt %, greater than 9 wt %, greater than 11 wt %, or greater than 13 wt % of a monomer or a combination of monomers, where wt % is based on the total weight of the coreactive composition. A coreactive composition provided by the present disclosure can comprise, for example, less than 1 wt %, less than 3 wt %, less than 5 wt %, less than 7 wt %, less than 9 wt %, less than 11 wt %, or less than 13 wt % of a monomer or a combination of monomers, where wt % is based on the total weight of the coreactive composition.

A coreactive composition provided by the present disclosure can comprise, for example, from 10 wt % to 80 wt % of a first elastomeric prepolymer; from 10 wt % to 80 wt % of a second elastomeric prepolymer; and from 5 wt % to 25 wt % of a third elastomeric prepolymer, wherein wt % is based on the total weight of the first elastomeric prepolymer, the second elastomeric prepolymer, and the third elastomeric prepolymer in the coreactive composition.

A coreactive composition provided by the present disclosure can comprise, for example, from 15 wt % to 75 wt % of a first elastomeric prepolymer; from 15 wt % to 75 wt % of a second elastomeric prepolymer; and from 10 wt % to 20 wt % of a third elastomeric prepolymer, wherein wt % is based on the total weight of the first elastomeric prepolymer, the second elastomeric prepolymer, and the third elastomeric prepolymer in the coreactive composition.

A coreactive composition provided by the present disclosure can comprise, for example, from 20 wt % to 70 wt % of a first elastomeric prepolymer; from 20 wt % to 70 wt % of a second elastomeric prepolymer; and from 10 wt % to 20 wt % of a third elastomeric prepolymer, wherein wt % is based on the total weight of the first elastomeric prepolymer, the second elastomeric prepolymer, and the third elastomeric prepolymer in the coreactive composition.

A coreactive composition can comprise, for example from 1 wt % to 30 wt % of the third elastomeric prepolymer, and independently from 30 wt % to 70 wt % of each of the first and second elastomeric prepolymers, where wt % is based on the total weight of the coreactive composition. A coreactive composition can comprise, for example from 5 wt % to 25 wt % of the third elastomeric prepolymer, and independently from 35 wt % to 65 wt % of each of the first and second elastomeric prepolymers, where wt % is based on the total weight of the coreactive composition.

A coreactive composition can be prepared by combining and mixing two reactive components. A first component can comprise the first elastomeric prepolymer and the second component can comprise the second elastomeric prepolymer. Each of the first component and the second component can independently comprise other monomers, prepolymers, and/or additives in addition to the elastomeric prepolymers. For example, the first reactive component can comprise a polyisocyanate elastomeric prepolymer and can be referred to as the polyisocyanate component and the second reactive component can comprise a polyamine elastomeric prepolymer and can be referred to as the polyamine component. The polyisocyanate and polyamine components can be combined to form a polyurea coreactive composition. The first and/or second component can comprise the third elastomeric prepolymer, or the third elastomeric prepolymer can be included in a third component that is combined and mixed with the first and second components to form a coreactive composition.

A polyamine component can comprise, for example, an elastomeric polyamine prepolymer and a monomeric polyamine. For example, a polyamine component can comprise a trifunctional polyamine polyether prepolymer and a monomeric diamine. For example, a polyamine component can comprise from 30 wt % to 90 wt % of an elastomeric polyamine prepolymer, from 40 wt % to 80 wt %, from 30 wt % to 70 wt %, or from 40 wt % to 60 wt % of an elastomeric polyamine prepolymer, where wt % is based on the total weight of the polyamine in the polyamine component. For example, a polyamine component can comprise from 10 wt % to 70 wt % of a monomeric polyamine, from 20 wt % to 60 wt %, from 30 wt % to 50 wt % of a monomeric polyamine, where wt % is based on the total weight of the polyamine in the polyamine component. For example, a polyamine component can comprise from 30 wt % to 90 wt % of an elastomeric polyamine prepolymer and from 10 wt % to 70 wt % of a monomeric polyamine; from 40 wt % to 80 wt % of an elastomeric polyamine prepolymer and from 10 wt % to 60 wt % of a monomeric polyamine; or from 50 wt % to 70 wt % of a polyamine prepolymer and from 30 wt % to 50 wt % of a monomeric polyamine; where wt % is based on the total weight of the polyamine in the polyamine component. A polyamine component can comprise, for example, greater than 10 wt % of an elastomeric polyamine prepolymer, greater 30 wt %, greater than 50 wt %, or greater than 70 wt % of an elastomeric polyamine prepolymer; and less than 70 wt % of the monomeric polyamine, less than 50 wt %, or less than 30 wt % of the monomeric polyamine, where wt % is based on the total weight of the polyamine in the polyamine component.

A polyamine component can comprise, for example, from 15 wt % to 55 wt % of a monomeric polyamine, from 20 wt % to 50 wt %, from 25 wt % to 45 wt %, or from 30 wt % to 40 wt %, where wt % is based on the total weight of the polyamine component. A polyamine component can comprise, for example, from 5 wt % to 35 wt % of an elastomeric polyamine prepolymer, from 10 wt % to 30 wt %, or from 15 wt % to 25 wt %, where wt % is based on the total weight of the polyamine component. A polyamine component can comprise, for example, from 10 wt % to 80 wt % of a filler or combination of filler, from 15 wt % to 75 wt %, from 20 wt % to 70 wt %, from 25 wt % to 65 wt %, from 30 wt % to 60 wt %, from 35 wt % to 55 wt %, or from 40 wt % to 50 wt % of a filler or combination of filler, where wt % is based on the total weight of the polyamine component.

A polyamine component can comprise, for example, a catalyst and a colorant.

A polyamine component can comprise, for example, from 25 wt % to 45 wt % of a monomeric polyamine, from 10 wt % to 30 wt % of an elastomer polyamine prepolymer, and from 35 wt % to 55 wt % of a filler, wherein wt % is based on the total weight of the polyamine component. A polyamine component can comprise, for example, from 25 wt % to 45 wt % of a monomeric polyamine, from 10 wt % to 30 wt % of an elastomer polyamine prepolymer, and from 35 wt % to 55 wt % of a filler, wherein wt % is based on the total weight of the polyamine component.

An isocyanate component can comprise an elastomeric polyisocyanate prepolymer or a combination of elastomeric polyisocyanate prepolymers.

A polyisocyanate component can comprise, for example, greater than 80% of an elastomeric polyisocyanate prepolymer, greater than 85 wt %, greater than 90 wt %, greater than 95 wt %, or greater than 98 wt % of an elastomeric polyisocyanate prepolymer, where wt % is based on the total weight of the polyisocyanate component.

A polyisocyanate component can comprise, for example, from 10 wt % to 80 wt % of a filler or combination of filler, from 15 wt % to 75 wt %, from 20 wt % to 70 wt %, from 25 wt % to 65 wt %, from 30 wt % to 60 wt %, from 35 wt % to 55 wt %, or from 40 wt % to 50 wt % of a filler or combination of filler, where wt % is based on the total weight of the polyisocyanate component. Aside from a filler, the balance of the polyisocyanate component can be the elastomeric polyisocyanate prepolymer.

The polyamine component and the polyisocyanate component can be combined such that the number of amine equivalents and the number of isocyanate equivalents is within 20%, within 15%, within 10%, or within 5%.

The polyamine component and the polyisocyanate component can be formulated such that the viscosity of the polyamine component and the viscosity of the polyisocyanate component is within 20%, within 15%, within 10% or within 5%. Mixing can be facilitated when the viscosity of the polyamine component and the polyisocyanate component are similar.

A coreactive composition provided by the present disclosure can be used to fabricate elastomeric articles using any suitable method. For example, a coreactive composition provided by the present disclosure can be fabricated by compression molding, injection molding, spraying, by additive manufacturing such as by three-dimensional printing, or a combination of any of the foregoing.

Automated manufacturing methods can be used to deposit a coreactive composition provided by the present disclosure and to fabricate elastomeric articles. Automated manufacturing methods can extend the range of coreactive compositions that can practically be applied. For example, because coreactive compositions can be formed immediately prior to deposition, fast curing chemistries can be used. The practical speed of depositing a coreactive composition can depend of the curing rate of the coreactive composition.

Additive manufacturing broadly encompasses robotic and automated manufacturing methods adapted for coreactive compositions. Additive manufacturing includes, for example, three-dimensional printing, fused deposition modeling, extrusion, and coextrusion. Coreactive additive manufacturing includes methods of combining the coreactants, mixing the coreactants to form a coreactive composition, and extruding the coreactive composition through a nozzle onto a substrate and/or onto a previously deposited layer comprising the coreactive composition. Additive manufacturing can facilitate the use of fast cure chemistries, manufacturing flexibility, and customizability.

Using additive manufacturing methods, individual layers of a coreactive composition can be applied directly to a substrate and/or to a previously deposited layer and subsequently cured and/or allowed to cure.

Compositions provided by the present disclosure can be used to fabricate articles using additive manufacturing.

Additive manufacturing encompasses robotic and automated manufacturing methods including, for example, extrusion and three-dimensional printing.

To facilitate additive manufacturing, the functional groups of the first elastomeric prepolymer and the second elastomeric prepolymer can be selected, for example, to provide a fast curing rate. For example, a functional group can be selected from a thiol group, and the second functional group can be a thiol group, an alkenyl group, an alkynyl group, an epoxy group, a Michael acceptor group, a Michael donor group, an isocyanate group, an amine group, a hydroxyl group, a silanol group, a polyalkoxysilyl group, and a combination of any of the foregoing. For example, a coreactive composition provided by the present disclosure can employ a polyurea curing chemistry in which a first elastomeric prepolymer comprises reactive amine groups and a second elastomeric prepolymer comprises reactive isocyanate groups.

The reaction of polyisocyanates with polyamines represents an attractive coreactive curing chemistry for use with robotic manufacturing methods because of the speed of the chemical reaction. With a fast cure rate, a coreactive composition can be deposited rapidly and the deposited layer can maintain an intended deposited shape following deposition and can have sufficient mechanical strength to support overlying layers of the coreactive composition.

A fast curing chemistry refers to a chemistry in which the co-reactive composition has a gel time of less than 30 minutes, less than 20 minutes, less than 10 minutes, less than 5 minutes, less than 4 minutes, less than 3 minutes, less than 2 minutes, less than 1 minute, less than 45 seconds, less than 30 seconds, less than 15 seconds, or less than 5 seconds. Coreactive compounds can have a gel time, for example, from 0.1 seconds to 30 minutes, from 0.1 seconds to 5 minutes, from 0.2 seconds to 3 minutes, from 0.5 seconds to 2 minutes, from 1 second to 1 minute, or from 2 seconds to 40 seconds. Gel time refers to the time following mixing of the coreactive compounds to when the coreactive composition is no longer stirrable by hand.

In additive manufacturing, a coreactive composition can be extruded through a nozzle to form an extrudate. The extrudate can be a non-structured extrudate or a structured extrudate. A non-structured extrudate refers to an extrudate that has a substantially uniform composition throughout the cross-sectional dimension of the extrudate. A structured extrudate has a non-uniform composition in at least one portion of the cross-sectional dimension of an extrudate.

Properties of a coreactive composition forming an extrudate such as the viscosity and cure rate can be selected to facilitate the ability of an extrudate to retain an intended shape following deposition of the extrudate.

A coreactive composition can have a fast gel time, for example, less than 5 minutes, less than 4 minutes, less than 3 minutes, less than 2 minutes, less than 1 minute, less than 45 seconds, less than 30 seconds, less than 15 seconds, or less than 5 seconds. A coreactive composition can have a fast gel time, for example, from 0.1 seconds to 5 minutes, from 0.2 seconds to 3 minutes, from 0.5 seconds to 2 minutes, from 1 second to 1 minute, or from 2 seconds to 40 seconds. Gel time refers to the time following mixing of the coreactive components to when the coreactive composition is no longer stirrable by hand.

A coreactive composition can have an intermediate gel time, for example, form 5 minutes to 60 minutes, such as from 10 minutes to 40 minutes, or from 20 minutes to 30 minutes.

A coreactive composition can have a long gel time, for example, of greater than 60 minutes, greater than 2 hours, greater than 4 hours, greater than 6 hours, or greater than 12 hours.

A coreactive composition can have a viscosity, for example, at from 200 cP to 50,000,000 cP, from 500 cP to 30,000,000 cP, from 1,000 cP to 20,000,000 cP, from 5,000 cP to 15,000,000 cP, from 5,000 cP to 10,000,000 cP, from 5,000 cP to 5,000,000 cP, from 5,000 cP to 1,000,000 cP, from 5,000 cP to 100,000 cP, from 5,000 cP to 50,000 cP, from 5,000 cP to 20,000 cP, from 6,000 cP to 15,000 cP, from 7,000 cP to 13,000 cP, or from 8,000 cP to 12,000 cP. A coreactive composition can have a viscosity, for example, greater than 200 cP, greater than 500 cP, greater than 1,000 cP, greater than 5,000 cP, greater than 10,000 cP, greater than 50,000 cP, greater than 100,000 cP, greater than 500,000 cP, greater than 1,000,000 cP, greater than 5,000,000 cP, or greater than 10,000,000 cP. A coreactive composition can have a viscosity, for example, less than 500 cP, less than 1,000 cP, less than 5,000 cP, less than 10,000 cP, less than 50,000 cP, less than 100,000 cP, less than 500,000 cP, less than 1,000,000 cP, less than 5,000,000 cP, or less than 10,000,000 cP, or less than 50,000,000 cP. Viscosity values are measured at 25° C. using an Anton Paar MCR 302 rheometer with a gap set to 1 mm, with a 25 mm-diameter parallel plate spindle, and an oscillation frequency of 1 Hz and amplitude of 0.3%.

A coreactive composition can have a tack free time, for example, of less than 2 minutes, less than 4 minutes, less than 6 minutes, less than 8 minutes, less than 10 minutes, less than 20 minutes, or less than 30 minutes.

A coreactive composition can have a time to a hardness of Shore 10A, for example, of less than 2 minutes, less than 4 minutes, less than 6 minutes, less than 8 minutes, less than 10 minutes, less than 20 minutes, or less than 30 minutes.

Each of the coreactive compositions forming a structured extrudate can have the same or different viscosities and/or cure rates.

Properties of a coreactive composition forming an exterior surface of a structured extrudate, such as the viscosity and the cure rate, can be selected to facilitate the ability of the structured extrudate to retain an intended shape following deposition onto a substrate or onto a previously applied layer comprising the coreactive composition. For example, an exterior layer of a structured extrudate can have a gel time, a tack free time, and a time to a hardness of Shore 10A, that is less than the corresponding times of an inner layer.

Coreactive compositions can be applied using robotic equipment. Robotic equipment for depositing an elastomeric composition can comprise one or more pumps, one or more mixers, and one or more nozzles. One or more coreactive components can be pumped into the one or more mixers to form a coreactive composition, which can be forced under pressure through one or more dies and/or one or more nozzles directed onto a surface and/or onto or adjacent a previously deposited layer.

The robotic equipment can comprise pressure controls, mixers, extrusion dies, coextrusion dies, coating applicators, temperature control elements, elements for irradiating a coreactive composition, or combinations of any of the foregoing.

The robotic equipment can comprise an apparatus for moving a nozzle with respect to a surface. The deposition nozzle can be mounted on a three-axis gantry or robotic arm capable of moving in three dimensions. The apparatus can be controlled by one or more processors.

A three-dimensional elastomeric article can be produced by forming successive portions or layers of an article by depositing a coreactive composition comprising onto a substrate and thereafter depositing additional portions or layers of the coreactive composition over the underlying deposited portion or layer and/or adjacent the previously deposited portion or layer. Layers formed from a coreactive composition can be successively deposited adjacent and/or onto a previously deposited layer to build a printed article.

A coreactive composition can be prepared by combining and mixing at least two reactive components, which, as described herein, can comprise a polyisocyanate component and a polyamine component. The third elastomeric prepolymer such as a silanol-functional elastomeric prepolymer can be included in the polyisocyanate and/or polyamine component or can be provided as a separate third reactive component, which can be combined and mixed with the first and second reactive components to form a coreactive composition. The reactive components can be combined in any suitable ratio. For example, a polyisocyanate component and a polyamine component can be mixed in a 1:1 volume ratio such that the volume of the two components used to form a coreactive composition differs by less than 20 vol %, by less than 10 vol %, or by less than 5 vol %. To facilitate homogeneous mixing, it can also be desirable that the reactive components such as the polyisocyanate and polyamine components have a similar viscosity such as a viscosity that differs by less than 20%, less than 10%, or less than 5%. The viscosities of the two components can be adjusted, for example, by using additives such as fillers and/or rheological control agents, and/or by heating the components. The ratio of equivalents of coreactive groups such as isocyanate groups to amine groups can also be selected to control the rate of cure of the coreactive composition and/or the properties of the cured coreactive composition.

A coreactive composition can be deposited in any orientation. For example, the nozzle can be directed downwards, upwards, sideways, or at any angle in between. In this way a coreactive composition can be deposited as a vertical wall or as an overhang. A coreactive composition can be deposited on a vertical wall, the lower surface of a tilted wall, or on the bottom of a horizontal surface. The use of a coreactive composition with a fast curing chemistry can facilitate the ability of an overlying layer to be deposited adjoining an underlying layer such that an angled surface can be fabricated. The angled surface can be angled upward with respect to horizontal or downward with respect to horizontal.

Two or more coreactive compositions can be deposited using any suitable equipment. The selection of suitable deposition equipment depends on a number of factors including the deposition volume, the viscosity of the composition and the complexity of the part being fabricated. Each of the two or more reactive components can be introduced into independent pumps and pumped into a mixer to combine and mix the two or more reactive components to form the coreactive composition. A nozzle can be coupled to the mixer and the mixed coreactive composition can be pushed or extruded under pressure through the nozzle.

Examples of suitable pumps include positive displacement pumps, syringe pumps, a piston pumps, and progressive cavity pumps. Pumps used to deliver two or more reactive components can be placed in parallel or placed in series. A suitable pump can be capable of pumping a liquid or viscous liquid through a nozzle orifice. This process can also be referred to as extrusion. A reactive component can be introduced into the mixer using two or more pumps in series.

A coreactive composition can be deposited by dispensing materials through a disposable nozzle attached to a progressive cavity two-component system, where the coreactive components are mixed in-line. A two-component dosing system can comprise, for example, two progressive cavity pumps that separately dose reactant reactive into a disposable static mixer dispenser or into a dynamic mixer. Other suitable pumps include positive displacement pumps, syringe pumps, piston pumps, and progressive cavity pumps. Upon extrusion through a nozzle, the coreactive composition forms an extrudate which can be deposited onto a surface or previously deposited layer to provide an initial layer of the coreactive composition and successive layers of the coreactive composition.

The base, the deposition system, or both the base and the deposition system may be moved to build up a three-dimensional article. The motion can be made in a predetermined manner, which may be accomplished using any suitable CAD/CAM method and apparatus such as robotics and/or computerize machine tool interfaces.

An extrudate may be dispensed continuously or intermittently to form an initial layer and successive layers. For intermittent deposition, a dosing system may interface with a relay switch to shut off the pumps, such as the progressive cavity pumps and stop the flow of coreactive materials. Any suitable switch such as an electromechanical switch that can be conveniently controlled by any suitable CAD/CAM methodology can be used.

A deposition system can include an in-line static and/or dynamic mixer as well as separate pressurized pumping compartments to hold the at least two coreactive components and feed the coreactive components into the static and/or dynamic mixer. A mixer such as an active mixer can comprise a variable speed central impeller having high shear blades within a nozzle. A range of nozzles may be used which have an exit orifice dimension, for example, from 0.2 mm to 50 mm, from 0.5 mm to 40 mm, from 1 mm to 30 mm, or from 5 mm to 20 mm. The exit shape of the nozzle can be round, spherical, oval, square, rectangular, trapezoidal, triangular, planar, in the shape of a sheet, or any other suitable shape. The dimensions of the exit orifice can be dynamically changed during the deposition process.

A range of static and/or dynamic mixing nozzles may be used which have, for example, an exit orifice dimension from 0.6 mm to 2.5 mm, and a length from 30 mm to 150 mm. For example, an exit orifice diameter can be from 0.2 mm to 4.0 mm, from 0.4 mm to 3.0 mm, from 0.6 mm to 2.5 mm, from 0.8 mm to 2 mm, or from 1.0 mm to 1.6 mm. A static mixer and/or dynamic can have a length, for example, from 10 mm to 200 mm, from 20 mm to 175 mm, from 30 mm to 150 mm, or from 50 mm to 100 mm. A mixing nozzle can include a static and/or dynamic mixing section and a dispensing section coupled to the static and/or dynamic mixing section. The static and/or dynamic mixing section can be configured to combine and mix the coreactive components. The dispensing section can be, for example, a straight tube having any of the above orifice diameters. The length of the dispensing section can be configured to provide a region in which the coreactive composition can begin to react and build viscosity before being deposited on the article. The length of the dispensing section can be selected, for example, based on the speed of deposition, the rate of reaction of the coreactive composition, and the desired viscosity.

A coreactive composition can have a residence time in the static and/or dynamic mixing nozzle, for example, from 0.25 seconds to 5 seconds, from 0.3 seconds to 4 seconds, from 0.5 seconds to 3 seconds, or from 1 seconds to 3 seconds. Other residence times can be used as appropriate based on the curing chemistries and curing rates.

In general, a suitable residence time is less than the gel time of the coreactive composition.

A coreactive composition can have a volume flow rate, for example, from 0.1 mL/min to 20,000 mL/min, such as from 1 mL/min to 12,000 mL/min, from 5 mL/min to 8,000 mL/min, or from 10 mL/min to 6,000 mL/min. The volume flow rate can depend, for example, on the viscosity of a coreactive composition, the extrusion pressure, the nozzle diameter, and the reaction rate of the coreactive compounds. Volume flow rate can be measured according to ASTM D1238.

A coreactive composition can be used at a print speed, for example, from 1 mm/sec to 400 mm/sec, such as from 5 mm/sec to 300 mm/sec, from 10 mm/sec to 200 mm/sec, or from 15 mm/sec to 150 mm/sec. The print speed can depend, for example, on the viscosity of the coreactive composition, the extrusion pressure, the nozzle diameter, and the reaction rate of the coreactive components. The print speed refers to the speed at which a nozzle used to extrude a coreactive composition moves with respect to a surface onto which the coreactive composition is being deposited. It is desirable that the deposited coreactive composition retain an intended shape when applied to a surface and/or a previously deposited layer.

A static and/or dynamic mixing nozzle can be heated or cooled to control, for example, the rate of reaction between the coreactive compounds and/or the viscosity of the coreactive composition. An orifice of a deposition nozzle can have any suitable shape and dimensions. A system can comprise multiple deposition nozzles. The nozzles can have a fixed orifice dimension and shape, or the nozzle orifice can be controllably adjusted. The mixer and/or the nozzle may be cooled to control an exotherm generated by the reaction of the coreactive compounds.

The constituents of a coreactive composition can be dynamically adjusted during deposition. The constituents can be adjusted continuously and/or intermittently such that different coreactive compositions are deposited in different portions of an elastomeric article and as a result, different portions of the elastomeric article can have different properties. For example, some portions of an elastomeric article can be more flexible than other portions of the elastomeric article.

The constituents of coreactive composition can be changed by (1) adjusting the volume ratio of one or more of the two or more coreactive components; (2) by introducing an additional coreactive component; (3) by removing one or more of the coreactive components; (4) by introducing a non-coreactive component; (5) by removing a non-coreactive component; (6) by changing the composition of a coreactive component; (7) by changing the composition of a non-coreactive component; or a combination of any of the foregoing.

A non-coreactive component refers to a composition that does not comprise a coreactive compound. For example, a non-coreactive component can comprise a filler, a catalyst, an initiator, a colorant, a corrosion inhibitor, an adhesion promoter, and/or other additive or combination of additive suspended in a solvent, a plasticizer, or dispersant. A non-coreactive component can be uniformly combined and mixed with the coreactive components or can be non-uniformly combined and mixed with the coreactive components.

A layer can be applied to at least a portion of a surface of a coreactive composition and/or extrude. A layer can be applied, for example, passing an extrusion through a liquid composition to provide a layer on the exterior surface or a portion of the exterior surface of the extrusion. The layer can comprise materials the enhance adhesion between adjoining layers of a printed article and/or facilitate covalent bonding between adjoining layer. For example, a thin film coating can comprise compounds having groups reactive with functional groups in an adjoining layer. Articles having layers that promote adhesion or bonding between adjoining layers can enhance the structural integrity of the three-dimensional printed article.

Coreactive three-dimensional printing methods provided by the present disclosure can be used to fabricate elastomeric articles in which adjoining layers have a high mechanical strength. Adjoining layers of a coreactive composition can chemically bond and/or physical bond to create a mechanically strong interlayer interface. The strength of the interlayer interface can be determined by measuring the fracture energy according to ASTM D7313. Chemically resistant elastomeric articles made using methods provided by the present disclosure can have a fracture energy that is substantially the same as the fracture energy of an individual layer. For example, the fracture energy of the elastomeric articles and the fracture energy of an individual cured layer of the coreactive composition can be, for example, within less than 10%, less than 5%, less than 2% or less 1%.

Elastomeric articles fabricated using the coreactive compositions provided by the present disclosure and using the methods provided by the present disclosure are included within the scope of the present invention.

A cured elastomer prepared from a coreactive composition can have a tensile strength, for example, greater than 8 MPa, greater than 9 MPa, greater than 10 MPa, greater than 14 MPa, greater than 18 MPa, greater than 22 MPa, or greater than 26 MPa, as determined according to ASTM D412.4893. A cured elastomer prepared from a coreactive composition can have tensile strength, for example, from 9 MPa to 26 MPa, from 8 MPa, to 24 MPa, from 8 MPa to 18 MPa, or from 9 MPa to 14 MPa, as determined according to ASTM D412.4893.

A cured elastomer prepared from a coreactive composition can have a tensile strain, for example, greater than 1,000%, greater than 2,000%, greater than 3,000%, or greater than 4,000%, as determined according to ASTM D412.4893. A cured elastomer prepared from a coreactive composition can have a tensile strain, for example, from 1,000% to 5,000%, from 1,000% to 4,000%, or from 2,000% to 3,000%, as determined according to ASTM D412.4893.

A cured elastomer prepared from a coreactive composition provided by the present disclosure can exhibit a tensile strength that is from 5% to 25%, such as from 10% to 20% greater than the tensile strength of a comparable elastomer formed from a coreactive composition without the third, higher molecular weight prepolymer.

A cured elastomer prepared from a coreactive composition provided by the present disclosure can exhibit a maximum tensile strain that is from 5% to 35%, such as from 10% to 25% greater than the maximum tensile strain of a comparable elastomer formed from a coreactive composition without the third, higher molecular weight prepolymer.

A cured elastomer prepared from a coreactive composition can have a hardness, for example, less than Shore 90A, less than Shore 70A, less than Shore 50A, less than Shore 30A, or less than Shore 20A, where the Shore A hardness is determined using a Type A durometer according to ASTM D2240. A cured elastomer prepared from a coreactive composition can have a hardness, for example, from Shore 10A to Shore 90A, from Shore 20A to Shore 80A, or from Shore 30A to Shore 70A, where the Shore A hardness is determined using a Type A durometer according to ASTM D2240.

A cured elastomer prepared from a coreactive composition provided by the present disclosure can exhibit, for example, a tensile strength greater than 7 MPa, an elongation at break greater than 500%, a secant modulus greater than 3 MPa, a hardness of from Shore 60A to Shore 80A, and a specific gravity less than 1.04.

A cured elastomeric article can be fabricated by depositing successive layers of a coreactive composition adjoining previously deposited layer of the coreactive composition. When a subsequent layer of the coreactive composition is deposited against a previously deposited layer that has not fully cured, the adjoining layers can coreact to form covalent bonds between the adjoining layers. As a result of the interlayer bonding, the integrity of the cured elastomeric article is greater than similar articles fabricated without interlayer bonding. Thus, three-dimensionally printed elastomeric articles in which deposited layers are covalently bonded are included within the scope of the invention.

A coreactive composition provided by the present disclose can be used to fabricate an elastomeric article or an elastomeric portion of an article. For example, an entire article or a portion or portions of an article can be fabricated using a coreactive composition provided by the present disclosure. For example, a shoe can comprise an elastomeric sole fabricated using a coreactive composition provided by the present disclosure. The elastomeric shoe sole can be fabricated using three-dimensional printing.

Articles can comprise elastomeric portions of the article fabricated using a coreactive composition provided by the present disclosure and other portions of the article can be non-elastomeric and be fabricated using a non-elastomeric coreactive composition. For example, flexible portions such as joints or shock-resistant portions of an article such as exterior surfaces of an article can be fabricated using a coreactive composition provided by the present disclosure and other portions of the article can be rigid and can be fabricated using a non-elastomeric coreactive composition.

Coreactive compositions provided by the present disclosure can be used as a rubber replacement.

Examples of elastomeric articles that can be fabricated using the elastomeric material include shoes, wheel treads, gaskets, gloves, non-slip mats, flexible hinges, and generally most products where elastomers are currently already in use.

Other examples include interior vehicle parts such as interior automotive parts and interior aircraft parts.

Suitable elastomeric products include those in which high tensile strength, higher tensile elongation, and high hardness are desired, and where a high filler content is not appropriate.

Examples of elastomeric articles that can be fabricated using coreactive compositions provided by the present disclosure include seals, sealants, grommets, gaskets, washers, bushings, flanges, insulation, shoe soles, boots, footwear, handles, bumpers, shock absorbers, matting, tires, supports, automotive parts, vehicle parts, aerospace parts, marine parts, athletic equipment, toys, novelty items, and casings.

Elastomeric parts include three-dimensionally printed parts having an aspect ratio (height or thickness to width) that is greater than 0, such as greater than 0.01, greater than 0.1, greater than 1, greater than 10, or greater than 100. The aspect ratio of a three-dimensionally printed part can be constant such as in the case of a gasket or can vary from point to point such as for a shim. The part can be flat such as in the case of a gasket or can have a finite radius of curvature such as in the case of an O-ring. A part can have a radius of curvature that can be constant such as in a cylinder or can b variable or complex such as in the case of a seal cap. A part can be hollow or solid, can have cavities, can be concave or convex. A part can comprise one or more of the above features.

Three-dimensional printing using coreactive compositions facilitates the ability to fabricate high-precision elastomeric articles having complex geometries and having physical properties at least comparable to elastomeric articles formed using other processes. Coreactive three-dimensional printing provides the ability to use a wide range of reactive materials and curing chemistries. The low viscosity of the reactive monomers and prepolymers can facilitate the ability to use a higher filler content not accessible to other three-dimensional printing methods such as thermoplastic three-dimensional printing. Three-dimensional printing of elastomeric articles using coreactive compositions can be done using versatile, processor-controlled equipment that can be modified as desired to produce a wide variety of parts. Furthermore, the low temperature processing and curing of coreactive compositions can provide elastomeric articles with low mechanical stress.

ASPECTS OF THE INVENTION

The invention is further defined by the following aspects.

Aspect 1. A coreactive composition comprising: (a) a first elastomeric prepolymer; (b) a second elastomeric prepolymer; and (c) a third elastomeric prepolymer, wherein, the first elastomeric prepolymer is reactive with the second elastomeric prepolymer; each of the first elastomeric prepolymer and the second elastomeric prepolymer independently comprises a number average molecular weight from 500 Da to 20,000 Da; the third elastomeric prepolymer comprises a number average molecular weight from 50,000 Da to 500,000 Da; and the number average molecular weight is determined by gel permeation chromatography.

Aspect 2. The coreactive composition of aspect 1, wherein the coreactive composition comprises: from 80 mol % to 98 mol % of the combination of the first elastomeric prepolymer and the second elastomeric prepolymer; and from 2 mol % to 20 mol % of the third elastomeric prepolymer, wherein mol % is based on the total moles of the first elastomeric prepolymer, the second elastomeric prepolymer, and the third elastomeric prepolymer in the coreactive composition.

Aspect 3. The coreactive composition of any one of aspects 1 to 2, wherein the third elastomeric prepolymer is not reactive with the first elastomeric prepolymer and with the second elastomeric prepolymer.

Aspect 4. The coreactive composition of any one of aspects 1 to 2, wherein the third elastomeric prepolymer is reactive with the first elastomeric prepolymer and/or the second elastomeric prepolymer.

Aspect 5. The coreactive composition of aspect 4, wherein a reaction rate of a reaction between the third elastomeric prepolymer and the first elastomeric prepolymer and/or the second elastomeric prepolymer is slower than a reaction rate of a reaction between the first elastomeric prepolymer and the second elastomeric prepolymer.

Aspect 6. The coreactive composition of any one of aspects 1 to 5, wherein the first elastomeric prepolymer comprises a polyisocyanate elastomeric prepolymer; and the second elastomeric prepolymer comprises a polyamine elastomeric prepolymer.

Aspect 7. The coreactive composition of aspect 6, wherein, the polyisocyanate prepolymer comprises an isocyanate-functional polyether prepolymer, an isocyanate-functional polybutadiene prepolymer, or a combination thereof; and the polyamine prepolymer comprises an amine-functional polyether prepolymer.

Aspect 8. The coreactive composition of any one of aspects 1 to 7, wherein the first elastomeric prepolymer and/or the second elastomeric prepolymer comprises a backbone having the structure of Formula (1a)-(1e):

  (1a)

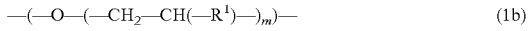  (1b)

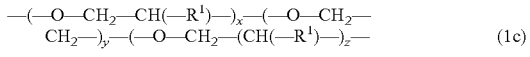  (1c)

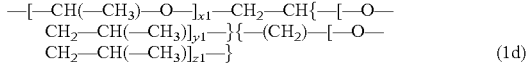  (1d)

  (1e)

wherein,
n is an integer from 10 to 5,000;
m is an integer from 10 to 5,000;
each $R^1$ is independently selected from hydrogen, methyl, and ethyl;
y is an integer from 2 to 50;
the sum of x+z is an integer from 1 to 10; and
the sum of x1+y1+z1 is an integer from 5 to 100.

Aspect 9. The coreactive composition of any one of aspects 1 to 8, wherein the second elastomeric prepolymer comprises a backbone having the structure of Formula (9):

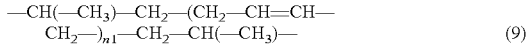  (9)

where n1 is an integer from 30 to 220.

Aspect 10. The coreactive composition of any one of aspects 1 to 8, wherein the second prepolymer comprises a backbone having the structure of Formula (2):

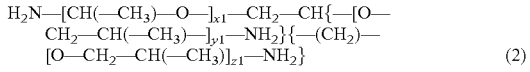  (2)

where the sum of x1+y1+z1 is an integer from 5 to 100.

Aspect 11. The coreactive composition of any one of aspects 1 to 10, wherein the third elastomeric prepolymer comprises a polysiloxane prepolymer.

Aspect 12. The coreactive composition of aspect 8, wherein the polysiloxane prepolymer comprises a silanol-functional polysiloxane prepolymer such as a silanol-functional polydimethylsiloxane prepolymer.

Aspect 13. The coreactive composition of any one of aspects 1 to 11, wherein the third prepolymer comprises a backbone having the structure of Formula (10):

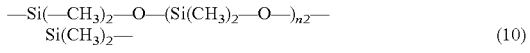  (10)

where n2 is an integer from 1,500 to 2,500.

Aspect 14. The coreactive composition of any one of aspects 1 to 13, wherein the coreactive composition comprises: from 10 wt % to 80 wt % of the first elastomeric prepolymer; from 10 wt % to 80 wt % of the second elastomeric prepolymer; and from 5 wt % to 25 wt % of the third elastomeric prepolymer, wherein wt % is based on the total weight of the first elastomeric prepolymer, the second elastomeric prepolymer, and the third elastomeric prepolymer in the coreactive composition.

Aspect 15. The coreactive composition of any one of aspects 1 to 14, wherein, each of the first elastomeric prepolymer and the second elastomeric prepolymer independently comprises a number average molecular weight from 2,000 Da to 6,000 Da; the third elastomeric prepolymer comprises a number average molecular weight from 100,000 Da to 400,000 Da; and the number average molecular weight is determined by gel permeation chromatography.

Aspect 16. The coreactive composition of any one of aspects 1 to 15, wherein each of the first elastomeric prepolymer and the second elastomeric prepolymer independently comprises a number average molecular weight from 1,000 Da to 3,500 Da.

Aspect 17. The coreactive composition of any one of aspects 1 to 16, further comprising a monomeric polyamine such as a monomeric polyamine having a molecular weight from 150 Da to 500 Da and/or a second diamine.

Aspect 18. The coreactive composition of any one of aspects 1 to 17, further comprising a filler such as a low-density filler, wherein the low-density filler comprises a specific gravity less than 1.

Aspect 19. The coreactive composition of any one of aspects 1 to 18, wherein each of the first elastomeric prepolymer and the second elastomeric prepolymer independently comprises a polypropylene glycol, a polybutadiene, a polycarbonate, a polyester, or a polytetrahydrofuran.

Aspect 20. A cured polymer prepared from the coreactive composition of any one of aspects 1 to 19.

Aspect 21. An article comprising the cured polymer of Aspect 20.

Aspect 22. The article of aspect 21, wherein, the article has a maximum tensile strain from 100% to 2,000%, wherein the maximum tensile strain is determined according to ASTM D412.4893; a Young's modulus from 4 MPa to 60 MPa such as from 4 MPa to 30 MPa, wherein the Young's modulus is determined according to ASTM D412.4893; a hardness greater than Shore 10A, wherein the Shore A hardness is determined according to ASTM D2240; and/or the maximum tensile strain is from 400% to 800% when pulled at a 500 mm/min strain rate.

Aspect 23. A method of fabricating an article comprising: (a) depositing the coreactive composition of any one of aspects 1 to 19, such as depositing in the desired shape of the article; and (b) curing the deposited coreactive composition to form the article.

Aspect 24. The method of aspect 23 wherein depositing comprises three-dimensional printing.

Aspect 25. The method of any one of aspects 23 and 24, further comprising, before step (a), combining a first component and a second component to provide the coreactive composition; wherein, the first component comprises the first elastomeric prepolymer; the second component comprises the second elastomeric prepolymer; and the first component and/or the second component comprises the third elastomeric prepolymer.

Aspect 26. An article fabricated using the method of any one of aspects 23 to 25.

Aspect 27. The article of aspect 26, wherein, the elastomeric article has a maximum tensile strain from 100% to 2,000%, wherein the maximum tensile strain is determined according to ASTM D412.4893; a Young's modulus from 4 MPa to 60 MPa such as from 4 MPa to 30 MPa, wherein the Young's modulus is determined according to ASTM D412.4893; a hardness greater than Shore 10A, wherein the Shore A hardness is determined according to ASTM D2240;

and/or the maximum tensile strain is from 400% to 800% when pulled at a 500 mm/min strain rate.

EXAMPLES

Embodiments provided by the present disclosure are further illustrated by reference to the following examples, which describe fabrication of elastomeric articles using three-dimensional printing and properties of the elastomeric articles. It will be apparent to those skilled in the art that many modifications, both to materials, and methods, may be practiced without departing from the scope of the disclosure.

Example 1

Elastomeric Polyurea

An elastomeric polyurea according to the present invention was prepared by combining a polyamine component and a polyisocyanate component.

The polyamine component included an amine-functional polyether prepolymer, Jeffamine® T5000, a monomeric polyamine, Clearlink® 1000, and a silanol-functional polydimethylsiloxane (silanol-functional PDMS). In this example, the third, higher molecular weight elastomeric prepolymer, the silanol-functional PDMS is included in the polyamine component.

The constituents of the polyamine component are listed in Table 1.

TABLE 1

Polyamine component.

| Component | Part by weight (g) |
|---|---|
| [1] Jeffamine ® T5000 | 34.5 |
| [2] Clearlink ® 1000 | 21.3 |
| [3] Silanol-functional PDMS | 34.8 |
| [4] Siloxane urethane diol | 0.4 |
| [5] Dibutyl tin dilaurate | 0.5 |
| [6] Cabosil ® TS-720 | 8.0 |
| [7] Blue Pigment | 0.5 |
| [8] Zirconox ® Mill Media | 64.0 |

[1] Jeffamine ® T-5000 polyetheramine, CAS# 64852-22-8, commercially available from Huntsman Corporation.
[2] Clearlink ® 1000, aliphatic secondary diamine, EW 161, CAS No. 2154279-60-4, commercially available from Dorf Ketal.
[3] Silanol-functional polydimethylsiloxane, 139,000 Da (120,000 Da to 160,000 Da),. CAS No. 70131-67-8, product code DMS-S51 commercially available from Gelest.
[4] Siloxane urethane diol, commercially available from PPG.
[5] Dibutyltin dilaurate, commercially available from Arkema Inc.
[6] Cabosil ® TS-720, fumed silica, commercially available from Cabot Corporation.
[7] Monolite ® Blue 3RN, commercially available from Heubach.
[8] Zirconox ® Milling Media, ceramic micro milling beads size 1.0-1.2 mm, commercially available from Jyoti Ceramic Ind.

To prepare the polyamine component, Jeffamine® T5000 and Clearlink® 1000 were weighed into an 8-oz lau jar. The siloxane urethane diol and the blue pigment were then added. The Zirconox® mill media was added and the formulation was dispersed for 1 h using standard lau mixing procedures.

The formulation was then filtered through a 125-µm filter and placed in a Max 300 L DAC cup (FlackTek Inc.). Cabosil® TS-720 was weighed into the DAC cup and dispersed using standard SpeedMixer® procedures. The silanol-functional PDMS was then added and dispersed using the SpeedMixer®.

To prepare the polyisocyanate component, isophorone diisocyanate (available from Thorsonn Chemicals) and dibutyl tin dilaurate were added to a flask and heated to 45° C. under nitrogen. Polymeg® 2000 (polytetramethylene ether glycol, commercially available from LyondellBasell) was added dropwise while maintaining the temperature below 75° C. The reaction was allowed to proceed for 1 h at 70° C. After the reaction mixture was cooled to 25° C., the product, an isocyanate-functional polyether, was weighed into a Max 300 L DAC cup and CAT 133 catalyst (available from PPG Industries) was added and dispersed using a SpeedMixer®.

The polyamine and polyisocyanate components were transferred from the DAC cups to respective Optimum® cartridges using a FlackTek SpeedDisc®. The polyamine and polyisocyanate components were combined in a 1:1 volume ratio, mixed, and printed using a ViscoTec 2K extruder.

Example 2

Comparative Polyurea

An elastomeric polyurea formulation was prepared by combining a polyamine component and a polyisocyanate component. The constituents of the polyamine component are listed in Table 2; and the polyisocyanate component was the same as that used in Example 1. The comparative polyamine component included an ethene homopolymer rather than the silanol-functional PDMS.

TABLE 2

Comparative polyamine component.

| Component | Parts by weight (g) |
|---|---|
| [1] Jeffamine ® T5000 | 48.7 |
| [2] Clearlink ® 1000 | 19.1 |
| [13] Petrolite ® 5000 T6 | 22.8 |
| [4] Siloxane urethane diol | 0.4 |
| [5] Cabosil ® TS-720 | 8.5 |
| [7] Blue Pigment | 0.5 |
| [8] Zirconox ® Mill Media | 70.0 |

[13] Petrolite ® 5000 T6, ethene homopolymer, average volume particle size from 5-7.5 µm, CAS No. 9002-88-4, commercially available from Baker Hughes.

To prepare the polyamine component Jeffamine® T5000 and Clearlink® 1000 were weighed into an 8-oz lau jar. The siloxane urethane diol and the blue pigment were then added. The Zirconox® mill media was then added to the lau jar and the mixture dispersed for 1 h using standard lau mixing procedures.

The formulation was then filtered through a 125-µm filter, into a Max 300 L DAC cup (FlackTek Inc.). Petrolite® 5000 T6 and Cabosil® TS-720 were then added and dispersed using standard SpeedMixer® procedures.

The polyamine component and the polyisocyanate component described in Example 1 were transferred from the DAC cups to separate Optimum® cartridges using a FlackTek SpeedDisc®. The polyamine and polyisocyanate components were combined in a 1:1 volume ratio, mixed, and printed using a ViscoTec 2K extruder.

Example 3

Mechanical Properties

To prepare the test samples, the polyamine component and the polyisocyanate component were independently pumped into a static mixer in a 1:1 volume ratio using a ViscoTec 2K extruder to provide a coreactive composition. The test samples were prepared by depositing successive layers of the coreactive composition to provide "dog bone" structures according to ASTM D412.4893.

Test samples for tensile testing were prepared using the coreactive compositions of Example 1 and Example 2. The mechanical properties of the test samples (D geometry) were evaluated according to the methods described in ASTM D412.4893. Hardness was measured using a model 2000 max-hand durometer type A tester, commercially available from Rex Gauge Co. A summary of the test results is provided in Table 3.

TABLE 3

Mechanical properties.

|  | Tensile Strain (maximum, %) | Tensile Strength (MPa) | Hardness Shore A |
|---|---|---|---|
| Example 1 | 1607 | 9.0 | 62 |
| Comparative Example 2 | 1282 | 6.3 | 65 |

The results presented in Table 3 shows that the addition of a PDMS to a polyurea formulation improves the tensile strength without reducing the elasticity or the hardness. The results demonstrate that the maximum tensile strain of elastomeric articles can be increased by incorporating a high molecular weight elastomeric prepolymer such as a polydimethylsiloxane into the composition without reducing the tensile strength and the hardness. The approach represents an improvement over the comparative composition in which a high filler content was used to provide a product having a high tensile strength and hardness.

To confirm that the properties of the cured polyurea elastomer were due to the presence of the polydimethylsiloxane and not to slight changes in the formulation, the physical properties of the cured polyurea elastomer with different amounts of the polydimethylsiloxane was measured. Using the component formulations of Example 1, the amount of PDMS in the polyamine component was increased while reducing the amount of Jeffamine® T5000. The volumetric mix ratio of the two components was varied while keeping the equivalence ratio of the polyisocyanate and the polyamine constant The results are shown in Table 4.

TABLE 4

Mechanical properties of the cured polyurea elastomer with different amounts of PDMS.

| Percent PDMS [1] | Tensile Strength (MPa) [2] | Max Tensile strain (%) [3] | Volume Mix Ratio NCO:NH [4] |
|---|---|---|---|
| 20 | 7.18 | 854 | 1.7:1 |
| 10 | 7.07 | 818 | 2.0:1 |
| 0 | 6.28 | 679 | 2.3:1 |

[1] Based on the total weight of the coreactive composition.
[2] Determined according to ASTM D412.4893
[3] Determined according to ASTM D412.4893.
[4] Equivalents ratio.

Example 4

Elastomeric Polyurea (2)

An elastomeric polyurea composition according to the present invention was prepared by combining a polyamine component and a polyisocyanate component.

The constituents of the polyamine component are listed in Table 5.

TABLE 5

Polyamine component.

| Component | | Parts by weight (g) |
|---|---|---|
| [1] Jeffamine ® T5000 | Polyamine prepolymer | 41.9 |
| [2] Clearlink ® 1000 | monomeric aliphatic secondary amine | 18.0 |
| [3] Silanol-functional PDMS | Polydimethylsiloxane | 25.0 |
| [4] BYK ®-9077 | Surfactant | 0.6 |
| [5] Bentone ® 34 | Bentonite Clay | 1.0 |
| [6] Cabosil ® TS-720 | Fumed Silica | 6.0 |
| [7] Petrolite ® 5000 T6 | Polyethylene Copolymer | 5.0 |
| [8] Finntalc ® M03C | Talc | 2.0 |
| [9] Orange Pigment | Pigment | 0.5 |
| [10] Zirconox ® Mill Media | Ceramic particles | 64.0 |

[1] Jeffamine ® T-5000 polyetheramine prepolymer, CAS# 64852-22-8, commercially available from Huntsman Corporation.
[2] Clearlink ® 1000, aliphatic secondary diamine, CAS# 2154279-60-4, commercially available from Dorf Ketal.
[3] Silanol-functional Polydimethylsiloxane, CAS# 70131-67-8, product code DMS-S51 commercially available from Gelest Inc.
[4] BYK ®-9077, wetting & dispersing additive, commercially available from BYK.
[5] Bentone ® 34, derivative of bentonite clay, commercially available from Elementis Specialties.
[6] Cabosil ® TS-720, fumed silica, commercially available from Cabot Corporation.
[7] Petrolite ® 5000 T6, polyethylene copolymer, commercially available from Baker Hughes.
[8] Finntalc ® M03C, association of talc, chlorite, dolomite, and magnesite, commercially available from Mondo Minerals.
[9] Irgazin ® Cosmoray ® Orange L 2950, orange pigment, commercially available from BASF.
[10] Zirconox ® Milling Media, ceramic micro milling beads size 1.0-1.2 mm, commercially available from Jyoti Ceramic Ind.

To prepare the polyamine component, Jeffamine® T5000, BYK®-9077, and Clearlink® 1000, Bentone® 34, Finntalc® M03C, and the orange pigment were weighed into an 8 oz. lau jar. The Zirconox® mill media was then added, and the formulation was dispersed for 1 h using standard lau procedures.

The formulation was then filtered through a 125-μm filter and poured into a Max 300 L DAC cup (FlackTek). Petrolite® 5000 T6 and Cabosil® TS-720 were added to the formulation and dispersed using a SpeedMixer®. The silanol-functional PDMS was then added and dispersed using the SpeedMixer®.

To prepare the polyisocyanate component, the isophorone diisocyanate (IPDI) and dibutyl tin dilaurate (Dabco® T-12, dibutyl tin dilaurate, commercially available from Air Products & Chemicals) were added to a suitable flask and heated to 45° C. under nitrogen. Krasol® LBH-P-3000 (linear hydroxyl-functional polybutadiene prepolymer, Mn=3,200 hydroxyl number 0.64, commercially available from Cray Valley) was added in portions while not exceeding 75° C., and the mixture held at 70° C. for 1 h. After cooling to 23° C., the mixture was weighed into a Max 300 L DAC cup. Cabosil® TS-720 was then added and the mixture dispersed using a SpeedMixer®.

The polyamine and polyisocyanate components were transferred from the DAC cups to respective Optimum® cartridges using a FlackTek SpeedDisc®. The components were combined in a 1:1 volume ratio, mixed, and deposited using three-dimensional printing at 23° C. with a ViscoTec 2K extruder.

Tensile testing dog bones were printed as described in Example 3 and tested using an Instron 5567 tensile tester to measure the elastomeric properties. The properties were as follows: 6.2 MPa Young's modulus and maximum strain of 593% elongation when pulled at a 500 mm/min strain rate as determined according to ASTM D945.

Example 5

Product Example

Examples of elastomeric articles that can be fabricated using coreactive compositions and corrective three-dimensional printing methods provided by the present disclosure shoe soles, wheel treads, non-slip mats, flexible hinges, and other elastomeric articles.

As an example, coreactive three-dimensional printing using an elastomeric coreactive composition provided by the present disclosure can be used to fabricate a sole of an athletic shoe.

Whereas particular embodiments of this invention have been described above for purposes of illustration, it will be evident to those skilled in the art that numerous variations of the details of the present invention may be made without departing from the invention as defined in the appended claims.

What is claimed is:

1. A coreactive composition comprising:
  (a) from 10 wt % to 80 wt % of a first elastomeric prepolymer, wherein the first elastomeric prepolymer comprises:
    an isocyanate-functional polyether prepolymer; and
    a number average molecular weight from 500 Da to 6,000 Da;
  (b) from 10 wt % to 80 wt % of a second elastomeric prepolymer, wherein the second elastomeric prepolymer comprises:
    an amine-functional polyether prepolymer; and
    a number average molecular weight from 500 Da to 6,000 Da; and
  (c) from 5 wt % to 25 wt % of a third elastomeric prepolymer, wherein the third elastomeric prepolymer comprises:
    a silanol-functional polydimethylsiloxane prepolymer; and
    a number average molecular weight from 50,000 Da to 500,000 Da, wherein,
    the number average molecular weight is determined by gel permeation chromatography; and wt % is based on the total weight of the first elastomeric prepolymer, the second elastomeric prepolymer, and the third elastomeric prepolymer in the coreactive composition.

2. The coreactive composition of claim 1, wherein the coreactive composition comprises:
  from 80 mol % to 98 mol % of the combination of the first elastomeric prepolymer and the second elastomeric prepolymer; and
  from 2 mol % to 20 mol % of the third elastomeric prepolymer, wherein,
  mol % is based on the total moles of the first elastomeric prepolymer, the second elastomeric prepolymer, and the third elastomeric prepolymer in the coreactive composition.

3. The coreactive composition of claim 1, wherein the third elastomeric prepolymer is not reactive with the second elastomeric prepolymer.

4. The coreactive composition of claim 1, wherein the third elastomeric prepolymer is reactive with the first elastomeric prepolymer and/or the second elastomeric prepolymer.

5. The coreactive composition of claim 4, wherein a reaction rate of a reaction between the third elastomeric prepolymer and the first elastomeric prepolymer and/or the second elastomeric prepolymer is slower than a reaction rate of a reaction between the first elastomeric prepolymer and the second elastomeric prepolymer.

6. The coreactive composition of claim 1, wherein the third elastomeric prepolymer comprises a backbone having the structure of Formula (10):

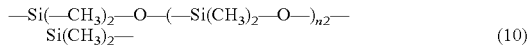

$$—Si(—CH_3)_2—O—(—Si(CH_3)_2—O—)_{n2}—Si(CH_3)_2— \quad (10)$$

where n2 is an integer from 1,500 to 2,500.

7. The coreactive composition of claim 1, wherein,
  the third elastomeric prepolymer comprises a number average molecular weight from 100,000 Da to 400,000 Da; and
  the number average molecular weight is determined by gel permeation chromatography.

8. The coreactive composition of claim 1, wherein each of the first elastomeric prepolymer and the second elastomeric prepolymer independently comprises a number average molecular weight from 1,000 Da to 3,500 Da.

9. The coreactive composition of claim 1, further comprising a monomeric polyamine having a molecular weight from 150 Da to 500 Da and/or a secondary diamine.

10. The coreactive composition of claim 1, further comprising a low-density filler, wherein the low-density filler comprises a specific gravity less than 1.

11. A cured polymer prepared from the coreactive composition of claim 1.

12. An article comprising the cured polymer of claim 11.

13. The article of claim 12, wherein,
  the article has a maximum tensile strain from 100% to 2,000%, wherein the maximum tensile strain is determined according to ASTM D412.4893;
  a Young's modulus from 4 MPa to 60 MPa, wherein the Young's modulus is determined according to ASTM D412.4893;
  a hardness greater than Shore 10A, wherein the Shore A hardness is determined according to ASTM D2240; and/or
  the maximum tensile strain is from 400% to 800% when pulled at a 500 mm/min strain rate.

14. A method of fabricating an article comprising:
  (a) depositing the coreactive composition of claim 1, in a shape of the article; and
  (b) curing the deposited coreactive composition to form the article.

15. The method of claim 14, wherein depositing comprises three-dimensional printing.

16. The method of claim 14, further comprising, before step (a), combining a first component and a second component to provide the coreactive composition; wherein,
  the first component comprises the first elastomeric prepolymer;
  the second component comprises the second elastomeric prepolymer; and
  the first component and/or the second component comprises the third elastomeric prepolymer.

17. An article fabricated using the method of claim 14.

* * * * *